United States Patent [19]
Hatayama et al.

[11] Patent Number: 5,802,534
[45] Date of Patent: Sep. 1, 1998

[54] APPARATUS AND METHOD FOR EDITING TEXT

[75] Inventors: Yoshinori Hatayama; Masahiro Ishiba; Tetsuo Takeyama; Takashi Hazui, all of Ogaki; Kimio Nagasawa, Komaki, all of Japan

[73] Assignee: Sanyo Electric Co., Ltd., Moriguchi, Japan

[21] Appl. No.: 498,879

[22] Filed: Jul. 6, 1995

[30] Foreign Application Priority Data

Jul. 7, 1994 [JP] Japan .................. 6-155959
Mar. 17, 1995 [JP] Japan .................. 7-059445

[51] Int. Cl.$^6$ .................................................. G06F 17/21
[52] U.S. Cl. ...................... 707/530; 707/500; 707/540
[58] Field of Search .............................. 395/751–761, 395/792–804, 601, 615

[56] References Cited

U.S. PATENT DOCUMENTS

| | | | |
|---|---|---|---|
| Re. 32,773 | 10/1988 | Goldwasser et al. | 395/793 |
| 4,888,730 | 12/1989 | McRae et al. | 395/793 |
| 5,008,810 | 4/1991 | Kessel et al. | 395/767 X |
| 5,235,654 | 8/1993 | Anderson et al. | 395/767 X |
| 5,263,174 | 11/1993 | Layman | 395/353 X |
| 5,267,155 | 11/1993 | Buchanan et al. | 395/803 |
| 5,303,150 | 4/1994 | Kameda | 395/803 |
| 5,305,205 | 4/1994 | Weber et al. | 395/793 |
| 5,530,644 | 6/1996 | Maruta et al. | 395/803 X |
| 5,551,049 | 8/1996 | Kaplan et al. | 395/794 X |

OTHER PUBLICATIONS

WordPerfect for Windows version 5.1 screen printouts, Apr. 1992.

*Primary Examiner*—Joseph H. Feild
*Attorney, Agent, or Firm*—Armstrong, Westerman, Hattori, McLeland & Naughton

[57] ABSTRACT

A text editing apparatus includes a display for displaying text including words, and an input device operable by an operator to designate a word from the words of the text displayed on the display. A processing unit of the apparatus includes a first memory for storing text data including data of a plurality of words, and a second memory for storing word data and label data indicating meaning suggested by individual words. Each word data is paired with its corresponding label data. Data of a first word designated by an user is identified from text data stored in the first memory. Label data associated with word data matching with the first word data is identified from the second memory. The processing unit produces a list of data regarding a plurality of words associated with the identified label data and selected from words stored in the second memory. The words of the list is displayed on a screen of the display.

27 Claims, 24 Drawing Sheets

Fig. 2

→ column
1   2 3   4 5 6 7 8 9 10   A

↓ 1
row 2
3
4

April 13, 1995

○○ electronic, co, LTD
Administrative Dept.,
Administrative Section    60

| Section chief | SAN | YO TARO | Esq |
| (課長) | (三 | 洋 太 郎) | (殿) |

58   CS   60a   62

ABC corporation, Ltd.
President Koichi Yamaoka
Yokohama Branch Teruo Kunioka

Re:   Opening of Our Yokohama Branch

Dear Mr. Sanyo:

We are pleased to announce the opening of our Yokohama branch as a result of our business expansion. It would be our pleasure if our new branch could be of service to you.

Sincerely,

○○ electronic, co, LTD
Administrative Dept.,
Administrative Section    60

| Section chief | SANYO | TA | RO | Esq |
| (課長) | (三 洋 | 太 | 郎) | (殿) |

58   60b   CS   62

ABC corporation, Ltd.
President Koichi Yamaoka
Yokohama Branch Teruo Kunioka

Re:   Opening of Our Yokohama Branch

Dear Mr. Sanyo:

We are pleased to announce the opening of our Yokohama branch as a result of our business expansion. It would be our pleasure if our new branch could be of service to you.

Sincerely,

Fig. 4
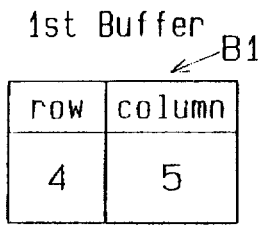
1st Buffer B1
| row | column |
|---|---|
| 4 | 5 |
Fig. 5A
2nd Buffer B2
|  | row | column |
|---|---|---|
| START | 4 | 5 |
| END | 4 | 5 |
Fig. 5B
2nd Buffer B2
|  | row | column |
|---|---|---|
| START | 4 | 5 |
| END | 4 | 8 |
Fig. 6
text data T
| character code | Section (課) | Chief (長) |  | SAN (三) | YO (洋) | TA (太) | RO (郎) |  | Esq. (殿) |
|---|---|---|---|---|---|---|---|---|---|
| ATT | 0 | 0 | 0 | 0 | 1 | 0 | 0 | 0 | 0 | 0 |
| representative label number | 0 | 0 | 0 | 0 | 0 | 0 | 0 | 0 | 0 | 0 |
| punctuation number | 1 | 2 | 1 | 1 | 4 | 3 | 2 | 1 | 1 | 1 |
| link number | 0 | 0 | 0 | 0 | 0 | 0 | 0 | 0 | 0 | 0 |

Fig. 9A label data list ML

| | label | attribute |
|---|---|---|
| 78~ | Exective position | 0 |
| 82~ | Title of respect | 0 |
| 88~ | Full name | 0 |
| 90~ | Address | 0 |
| | ⋮ | ⋮ |

Fig. 9B label data list ML

| | label | attribute |
|---|---|---|
| 78~ | Exective position | 0 |
| 82~ | Title of respect | 0 |
| 88~ | Full name | 0 |
| 90~ | Address | 0 |
| 86~ | Name | 1 |
| | ⋮ | ⋮ |

Fig. 10 table KT

| FROM | NEXT | label | attribute | STATUS |
|---|---|---|---|---|
| 0 | 0 | 0 | 0 | 0 |
| ⋮ | ⋮ | ⋮ | ⋮ | ⋮ |

Fig. 11 table KT

| FROM | NEXT | label | attribute | STATUS |
|---|---|---|---|---|
| 0 | 2 | Exective position (78) | 0 | 0 |
| ⋮ | ⋮ | ⋮ | ⋮ | ⋮ |

Fig. 12 table KT

| FROM | NEXT | label | attribute | STATUS |
|---|---|---|---|---|
| 0 | 2 | Exective position ~78 | 0 | 0 |
| 8 | 9 | Title of respect | 0 | 0 |
| ⋮ | ⋮ | ⋮ 84 | ⋮ | ⋮ |

Fig. 13 table KT

| FROM | NEXT | label | attribute | STATUS |
|---|---|---|---|---|
| 0 | 2 | Exective position ~78 | 0 | 0 |
| 8 | 9 | Title of respect ~84 | 0 | 0 |
| 3 | 7 | Name | 0 | 1 |
| ⋮ | ⋮ | 86 ⋮ | ⋮ | ⋮ |

Fig. 14 table KT

| FROM | NEXT | label | attribute | STATUS |
|---|---|---|---|---|
| 3 | 7 | Name ~86 | 0 | 1 |
| 0 | 2 | Exective position 78 | 0 | 0 |
| 8 | 9 | Title of respect | 0 | 0 |
| ⋮ | ⋮ | 84 ⋮ | ⋮ | ⋮ |

Fig. 15A label managing table  MT1

| label | label number |
|-------|--------------|
|       |              |

Fig. 15B label managing table  MT1

| label | label number |
|-------|--------------|
| Name  | 100          |
| ⋮     | ⋮            |

86 →

Fig. 16A number managing table  MT2

| representative label number | label number |
|-----------------------------|--------------|
|                             |              |

Fig. 16B number managing table  MT2

| representative label number | label number |
|-----------------------------|--------------|
| 10                          | 100          |

Fig. 17 text data T

| character code | | Section (課) | Chief (長) | | SAN (三) | YO (洋) | TA (太) | RO (郎) | | Esq. (殿) |
|---|---|---|---|---|---|---|---|---|---|---|
| ATT | | 0 | 0 | 0 | 1 | 1 | 1 | 1 | 0 | 0 |
| representative label number | | 0 | 0 | 0 | 10 | 10 | 10 | 10 | 0 | 0 |
| punctuation number | | 1 | 2 | 1 | 1 | 4 | 3 | 2 | 1 | 1 | 1 |
| link number | | 0 | 0 | 0 | 0 | 0 | 0 | 0 | 0 | 0 |

Fig. 18 text data T

| character code | | Section (課) | Chief (長) | | SAN (三) | YO (洋) | TA (太) | RO (郎) | | Esq. (殿) |
|---|---|---|---|---|---|---|---|---|---|---|
| ATT | | 0 | 0 | 0 | 1 | 1 | 1 | 1 | 0 | 0 |
| representative label number | | 0 | 0 | 0 | 0 | 0 | 0 | 0 | 0 | 0 |
| punctuation number | | 1 | 2 | 1 | 1 | 4 | 3 | 2 | 1 | 1 | 1 |
| link number | | 0 | 0 | 0 | 0 | 0 | 0 | 0 | 0 | 0 |

Fig. 21

| label | word | user selection frequency |
|---|---|---|
| Name | SANYO TARO | 10 |
| 202 — | TANAKA HANAKO | 8 |
| ~ | ~ | ~ |
| 204 — | ISHIHARA SHINGO | |
| 206 — | MIZUTANI YUKO | 2 |
| 208 — | TANABE YASUHIRO | 1 |
| 210 — | OKAMURA DAISUKE | 1 |

250 — (Name label), Bu

Fig. 22A

| label | word | user selection frequency |
|---|---|---|
| Name | SANYO TARO | 10 |
| 202 — | TANAKA HANAKO | 9 |
| ~ | ~ | ~ |
| 204 — | ISHIHARA SHINGO | 2 |
| 206 — | MIZUTANI YUKO | 1 |
| 208 — | TANABE YASUHIRO | 1 |
| 210 — | OKAMURA DAISUKE | 1 |

| label | word | user selection frequency |
|---|---|---|
| Name | SANYO TARO | 10 |
| 202 — | TANAKA HANAKO | 9 |
| ~ | ~ | ~ |
| 204 — | ISHIHARA SHINGO | 2 |
| 212 — | HIKITA HIDEHARU | 1 |
| 206 — | MIZUTANI YUKO | 1 |
| 208 — | TANABE YASUHIRO | 1 |

| | words | |
|---|---|---|
| 200 — | SANYO TARO | |
| 202 — | TANAKA HANAKO | |
| ~ | ~ | |
| 204 — | ISHIHARA SHINGO | |
| 212 — | HIKITA HIDEHARU | |
| 206 — | MIZUTANI YUKO | |
| 208 — | TANABE YASUHIRO | |

| customer name | company name | executive position | company address | age | note |
|---|---|---|---|---|---|
| SASAKI NAO | ○○○ Co.,LTD | Manager | | | |
| TAKEMOTO KENICHI | ○○ ELECTRONIC, Co.,LTD | | | | |
| TSURUTA KOKICHI | | | | | |
| TODA MASAHARU | | | | | |
| NAKASIMA TETSUO | | | | | |
| ... | ... | ... | ... | ... | ... |

100 — customer name
102 — company name
104 — executive position
106 — company address
108 — age
110 — note
130, 402, 404, 406, 408, 410
DB

Fig. 27

```
Address books  — 302
Employee name lists — 304
Member name lists — 306
Customer name lists — 300
Trade name books — 308
```

A

April 13, 1995

○○ electronic, co.LTD
Administrative Dept.,
Administrative Section

Section chief  SANYO TARO  Esq.  60
              (三井 太郎) (殿)
              (課長)

ABC corporation,Ltd.
President Koichi Yamaoka
Yokohama Branch Teruo Kunioka

Re: Opening of Our Yokohama Branch

Dear Mr. Sanyo:

We are pleased to announce the opening of our Yokohama branch as a result of our business expansion. It would be our pleasure if our new branch could be of service to you.

Sincerely,

Fig. 30

| character code | Section (課) | Chief (長) | | | SAN (三) | YO (洋) | TA (太) | RO (郎) | | Esq. (殿) |
|---|---|---|---|---|---|---|---|---|---|---|
| ATT | 0 | 0 | 0 | 0 | 1 | 1 | 1 | 1 | 0 | 0 |
| representative label number | 0 | 0 | 0 | 0 | 10 | 10 | 10 | 10 | 0 | 0 |
| punctuation number | 1 | 2 | 1 | 1 | 4 | 3 | 2 | 1 | 1 | 1 |
| link number | 0 | 0 | 0 | 0 | 0 | 0 | 0 | 0 | 0 | 0 |

58 — text data 500 — 62, T

○○ electronic, co, LTD
Administrative Dept.,
Administrative Section          500
Section chief  TAKEMOTO KENICHI  Esq.
(課長)         (武　本　賢　一)  (殿)

ABC corporation, Ltd.
President Koichi Yamaoka
Yokohama Branch Teruo Kunioka

Re:   Opening of Our Yokohama Branch

Dear Mr. Sanyo:

We are pleased to announce the opening of our Yokohama branch
as a result of our business expansion. It would be our pleasure if
our new branch could be of service to you.

Sincerely,

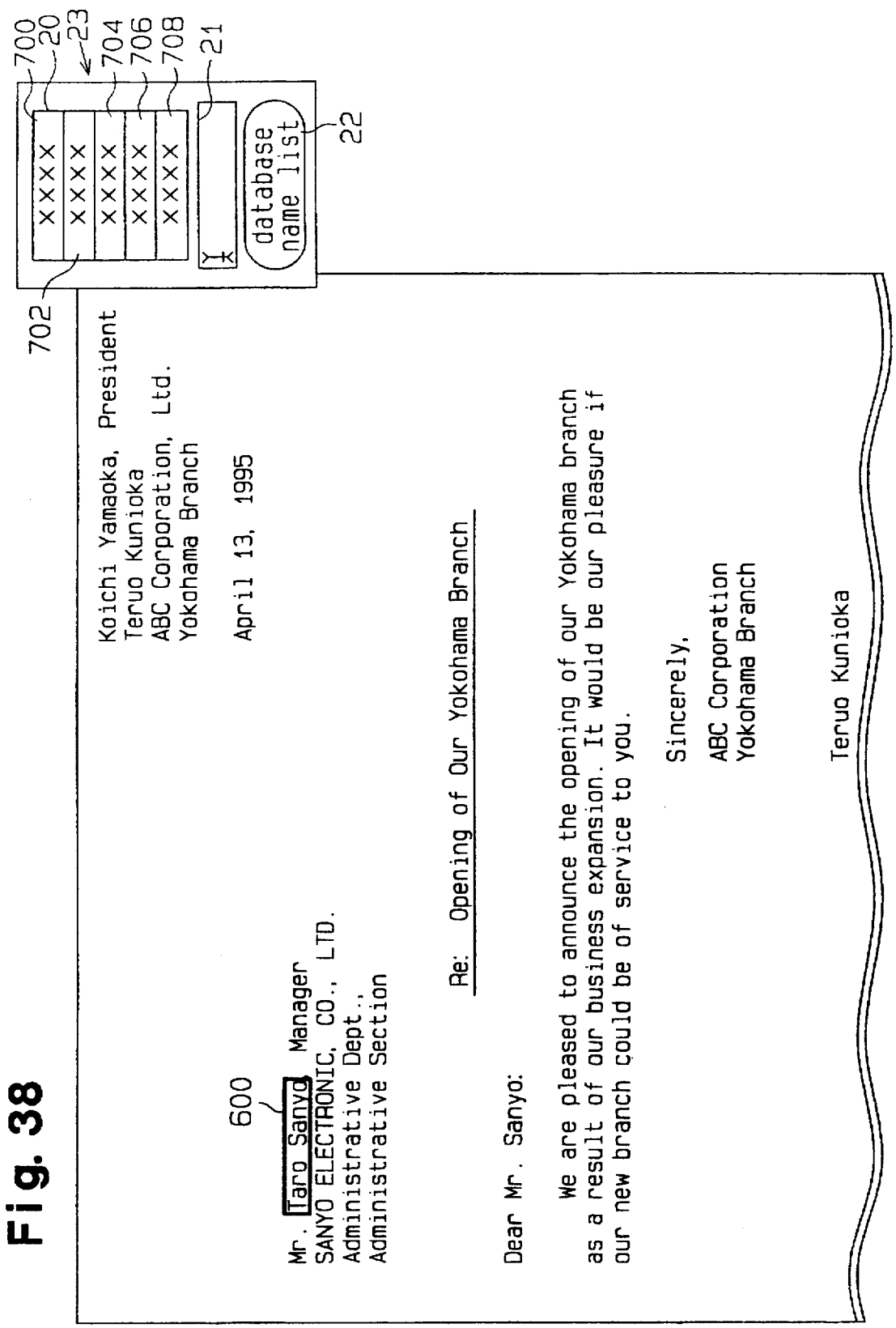

Fig. 39

```
                                    Koichi Yamaoka, President
                                    Teruo Kunioka
                                    ABC Corporation, Ltd.
                                    Yokohama Branch April 13, 1995

702
Mr. xxxx xxxxx  Manager
SANYO ELECTRONIC, CO., LTD.
Administrative Dept.,
Administrative Section Re:  Opening of Our Yokohama Branch Dear Mr. Sanyo:

We are pleased to announce the opening of our Yokohama branch
as a result of our business expansion. It would be our pleasure if
our new branch could be of service to you.

Sincerely,

ABC Corporation
                                    Yokohama Branch

Teruo Kunioka
```

APPARATUS AND METHOD FOR EDITING TEXT

BACKGROUND OF THE INVENTION

1. Field of the Invention

The present invention relates generally to an apparatus and method for computer assisted word processing, and in particular, to an apparatus and method for editing text in a document created with a word processor.

2. Description of the Related Art

Computerized text editors or word processors generally come equipped with an input device such as a keyboard and/or mouse, a computer processing unit, a display device and a storage medium such as a floppy or hard disk drive to store the document created using the text editor. Text editing typically begins with the execution of a computer program that allows the computer operator to input, edit, save and print text. Specifically, the computer operator executes the main text editing program, inputs text to create or edit a document, views the document on a monitor, makes appropriate changes if necessary and then saves the document on a hard or floppy disk for later retrieval. Previously created documents are edited by retrieving the document from the hard or floppy disk and using the input device to edit the previously entered text.

One of the more popular features in many word processor programs today is the merge function. This function allows users to merge a first document having a generalized format with a second document containing data specific to multiple individuals. The result of merging the first and second documents is a third document containing a plurality of forms containing information specific to various individuals. The process of editing material contained in each of the plurality of forms, should it be necessary, is an extremely time consuming task.

The editing burden increases when the document contains Japanese or other pictograph based text, due to the need to enter text using Roman characters (Romanji), the need to convert the Romanji to Hiragana or Katakana (Japanese syllabaries) and the need to convert the Hiragana or Katakana to Kanji (Chinese characters). Character conversion from Hiragana or Katakana to Kanji (hereinafter called KANA-KANJI conversion) introduces yet another time constraint on the computer operator.

The specific operation of the KANA-KANJI conversion process requires the computer operator to enter or edit text using Roman or Hiragana (KANA) based characters. The computer operator must then manipulate a Kanji conversion key to convert the Kana words to the most appropriate Kanji character or characters. This requires significantly more time than entering and editing roman only based text.

These constraints have, in the past, been addressed by three types of text editing programs. The first program type allows the operator to create multiple document templates, such as business and personal letters, based on preprogrammed template patterns. The computer operator selects a template by entering various parameters associated with a particular template. For example, the computer operator would enter parameters, such as, "congratulations on a birth" as a letter-type and "Smith" as the name of the receiver. Based on these parameters the program would search for the template associated with the letter type and name of the receiver. While document selection and editing of this type eliminates the need to enter all of the document's text, the computer operator must nonetheless take time to enter parameters necessary to select a particular template.

A second type of program allows the operator to edit a document through a selection of a word from a list of words chosen by the program and presented to the operator typically in a window on the computer monitor. For example, when editing the salutation of a letter, this type of program might present the operator with a choice of equivalent greeting words, such as "HAIKEI" (equivalent to "Dear Sirs") and "KINKEI" (equivalent to "Gentlemen"), etc. The operator would examine the list and choose the term most appropriate the particular document. A second example would be where the program presents the computer operator with a selection of greeting words appropriate to particular seasons of the year, e.g., "SHINRYOKU NO KOU" (the time between spring and summer) or "SOUSHUN NO KOU" (early spring). These types of programs, however, generally require the operator to input or register most, if not all, of the word choices. Consequently, text editing using this second type of program also requires that the computer operator spend large amounts of time entering text.

A third type of text editing program utilizes a database for selective text editing or word replacement. One well known example of this are text editors containing a database of synonyms accessible by the computer operator to replace document text. When the operator selects text within a document for replacement, the program presents the computer operator with a list of synonyms from which to choose a replacement. The operator then selects the most appropriate replacement and inserts it into the document. This third type of program, however, like the second program type, often requires the operator to input text into a program file prior to actual word replacement in the document. Consequently, this third type of program has the same limitations as that of the second type, i.e., the computer operator must spend valuable time preparing the program prior to actual text editing.

A further disadvantage of the third program type is way in which such programs display word lists, selected from the database, on the computer monitor. Many programs rank the replacement words, based on the frequency of being chosen as replacement text. A frequently chosen word is typically given a high display priority, while a infrequently chosen word is given a low display priority. In as much as most programs display replacement text in windows, the replacement text often times contains too many words for all of the words to appear in the window. In these instances, only the words having the highest display priority appear in the window. As a result, the operator ends up having to manipulate the word list or window in order to view all of the words, especially those among the lowest display priority. This is yet a another disadvantage of conventional text editing programs.

SUMMARY OF THE INVENTION

Accordingly, it is a primary objective of the present invention to provide a text editing apparatus for reducing necessary time to edit text in an existing document, reducing the works of and burden on a user.

To achieve the foregoing and other objects and in accordance with the purpose of the present invention, an improved text editing apparatus is provided. The apparatus according to the present invention includes a display for displaying text including words, and an input device operable by an operator to designate a word from the words of the text displayed on the display. The apparatus further includes a processing unit coupled to said display and said input device. The processing unit includes a first memory for storing text data including data of a plurality of words, and a second memory for storing plural pieces of word data and plural pieces of label data indicating meaning suggested by individual words. Each word data is paired with its corresponding label data. The processing unit: A) identifies data of a first word designated by an user using the input device, from text data stored in the first memory; B) identifies label data associated with word data matching with the first word data, from the second memory, by referring to the identified first word data; C) produces a list of data regarding a plurality of words associated with the identified label data and selected from words stored in the second memory; D) allows the display to display the words of the list; E) identifies a second word designated by the operator using the input device, from among the displayed words on the display; and F) replaces the first word data in the text data of the first memory with data of the second word.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIGS. 2 and 3 are diagrams showing a document on a display;

FIG. 4 is a diagram illustrating a first buffer in a main controller;

FIGS. 5A and 5B are diagrams illustrating a second buffer in the main controller;

FIG. 6 is a diagram illustrating various types of code associated with text data;

FIGS. 9A and 9B are diagrams illustrating the list of label data according to the present invention;

FIGS. 10, 11, 12, 13 and 14 are diagrams of tables used for the present invention;

FIGS. 15A and 15B are diagrams showing a label managing table;

FIGS. 16A and 16B are diagrams showing a number managing table;

FIGS. 17 and 18 are diagrams illustrating various codes associated with text data;

FIGS. 20, 21, 22A, 22B and 23 are diagrams illustrating the operation of a buffer used in the dictionary manager;

FIG. 26 is a diagram illustrating the organization of data in a database according to the present invention;

FIG. 27 is a diagram illustrating the display of a text document and window of database selections;

FIG. 30 is a diagram illustrating various codes associated with text data;

FIG. 31 is a diagram illustrating the appearance of a document on a computer monitor;

FIG. 38 is a diagram illustrating the appearance of an English letter and a selection of replacement text as would be displayed in a computer monitor; and FIG. 39 is a diagram illustrating the appearance of an English letter when displayed on a computer monitor.

DETAILED DESCRIPTION OF THE PREFERRED EMBODIMENTS

Figure 1:
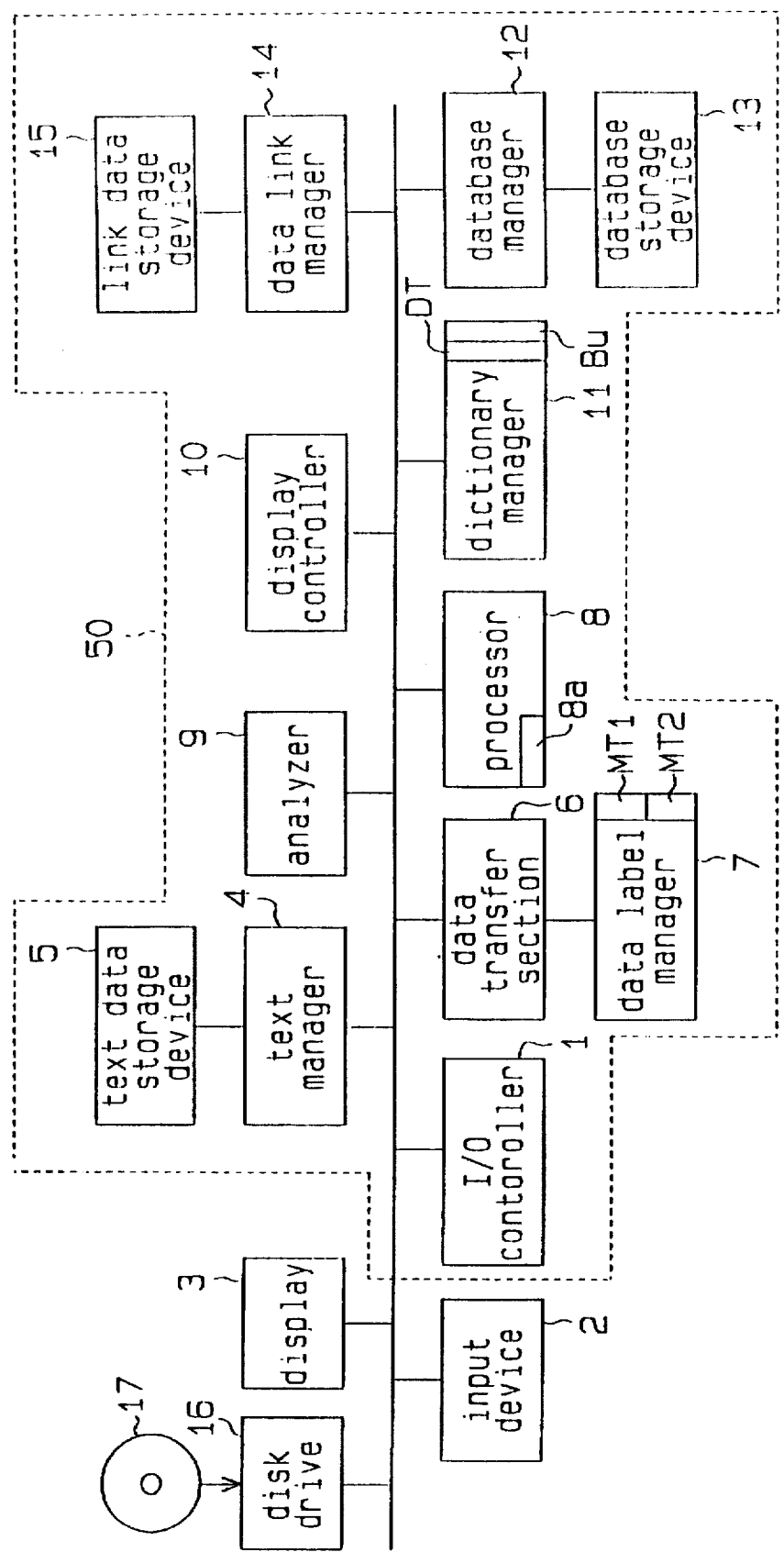
FIG. 1 is a block diagram of a text editor according to one embodiment of this invention.

A first embodiment of the present invention will now be described with reference to FIGS. 1 through 37. FIG. 1 illustrates a computer based word processing apparatus, commonly known as a text editor. AS shown in FIG. 1, this apparatus has an input device 2, a processing unit 50 including a computer and executable computer programs, a display 3 such as a CRT or a liquid crystal display, and a disk drive 16 f or reading data of a CD-ROM 17. The input device 2 and the display 3 are connected to the processing unit 50. The processing unit 50 further includes an I/O controller 1, a text manager 4, a text storage device 5, a data transfer section 6, a data label manager 7, a processor 8, an analyzer 9, a display controller 10, a dictionary manager 11, a database manager 12, a database storage device 13, a data link manager 14 and a data link storage device 15. In this invention, the text storage device 5, the database storage device 13 and the data link storage device 15 may be combined into a single data storage device.

The disk drive 16 reads codes of a control program for editing text in a document recorded on the CD-ROM 17 as a recording media, and supplies the read codes to a program code storing section 8a of the processor 8. The text editing control program is one of the above-mentioned executable computer programs. The processor 8 performs text edition according to the program.

The input device 2, typically a keyboard and/or a mouse, allows the computer operator to input text based characters and to select various text editing functions. The I/O controller 1 controls the input device 2 and the display 3. The I/O controller 1 includes a first buffer B1 to store data, formatted as shown in FIG. 4, to represents the row and column position of the cursor in the text editor. The text document A, shown in FIG. 2, represents a text document as it would appear on the display 3 during text editing. Suppose, as shown in FIG. 2, that a computer operator moves a cursor CS to the beginning character of a word 60. The I/O controller 1, would then store data in buffer B1 identifying row "4" and column "5", for example, as the final or terminal cursor position. The I/O controller 1 also includes a second buffer B2 to store rows and column data representative of the head (START) and tail (END) of a word as shown in FIGS. 5A and 5B.

The text data storage device 5, essentially a memory device, stores the text data T as illustrated in FIG. 6. The text manager 4 controls the reading and writing of text data to the storage device 5. The text data T includes code data indicative of individual characters of a text supplied from the input device 2 (Kanji characters shown in this diagram), ATT data indicative of the character attributes such as the highlighted display of a character, representative label number for identifying label, database linking data, and punctuation data for identifying the punctuation between words. Punctuation in Japanese language includes punctuation between the combinations of at least one word with one or more Hiragana character. The ATT and punctuation data are produced by the text manager 4.

Figures 7, 8A, 8B:
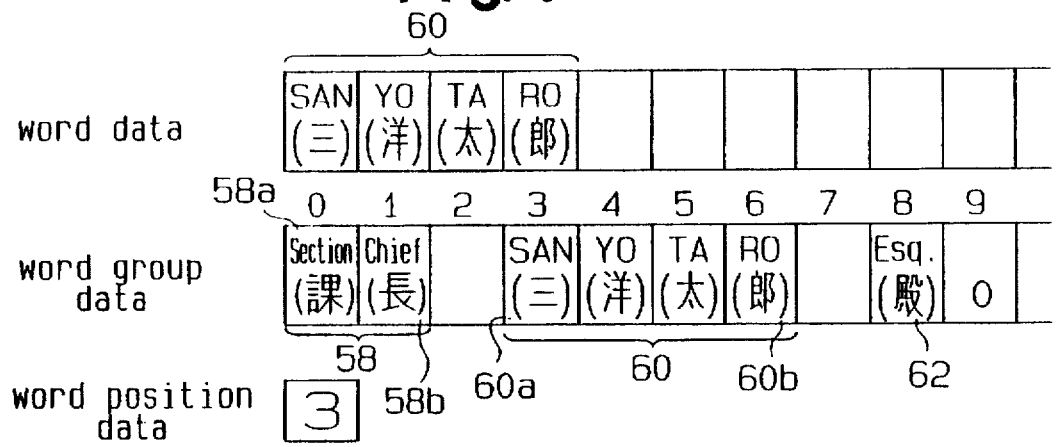
FIG. 7 is a diagram illustrating various aspects of data analysis.
FIGS. 8A and 8B are diagrams illustrating the use of dictionaries with the present invention.

The data transfer section 6 transfers processed data between the data label manager 7 and the analyzer 9. The analyzer 9 analyzes a predetermined word in a text using a label dictionary DT provided in the dictionary manager 11. The analyzer 9 then selects a word from the dictionary DT whose meaning corresponds to the highlighted text. The correspondence between the highlighted text and selected dictionary is based on a label. In other words, label serves as an identification code of the content suggested by a word (e.g. post, aim, classification). For example, the label of a word representing the addressee in a letter is "name". The dictionary manager 11 incorporates dictionary DT as a database in the processing unit 50, as shown in FIGS. 8A and 8B. The dictionary DT contains at least two field columns. The first field column stores a plurality of words 70, 72, etc commonly used when preparing or editing documents. The second field column stores a plurality of labels 78, 80, etc. Each word corresponds to at least one label and has a number of attributes, as discussed later. Typical dictionary labels include "company title", "title of respect", "company name", "address", "age", "document name" and "date". Should word selected by the user, have more than one associated label, the analyzer 9 would select each label. In this embodiment, however, the analyzer 9 chooses only one label for word selected by the user. The dictionary manager 11 further contains a buffer Bu for storing words 200, 202, 204, 206, 208, 210 etc. associated with a single label 250. Buffer Bu also stores the number of times each word is defined by the user, as shown in FIG. 21.

The data label manager 7 uses a label managing table MT1 to store the selected word's label together with a number identifying the label, as shown in FIG. 15B. Each label number is produced by the data label manager 7. The data label manager 7 further uses a number managing table MT2 to store a label number. Should there be more than one label number associated with a label, then the data label manager 7 adds a number representative of the collective label. The reason for this number assignment is to avoid having to represent the label with character codes.

Figure 24:
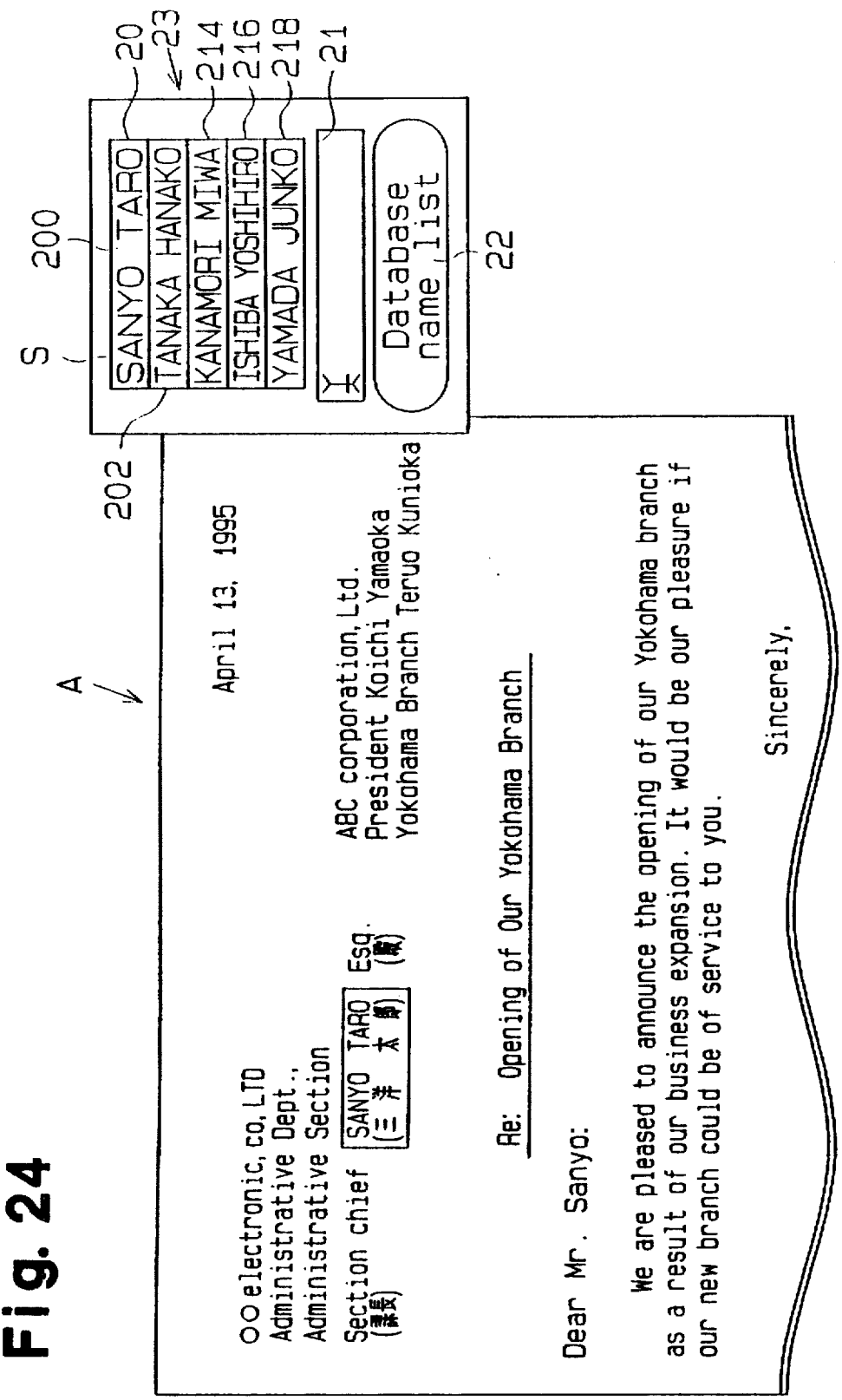
FIG. 24 is a diagram illustrating the display of a text document and a window containing text replacements.

The processor 8 shown in FIG. 1 controls the dictionary manager 11, the display controller 10, the database manager 12 and the data linking manager 14. The processor 8 reads the words in dictionary DT or database storage 13 associated with the label selected by the analyzer 9. Each word is then provided to the display controller 10. The display controller 10 displays a window 23 on display 3 that includes first and second columns 20 and 21 and a select button 22, as shown in FIG. 24. The words selected from the dictionary DT are displayed in the first column 20 and serve as potential replacements for word or text selected for replacement by the user. The second column 21 is used to permit the user to input a desired word other than the words displayed in the first column 20. The select key 22 is used to display words stored in the database storage 13.

Figure 25:
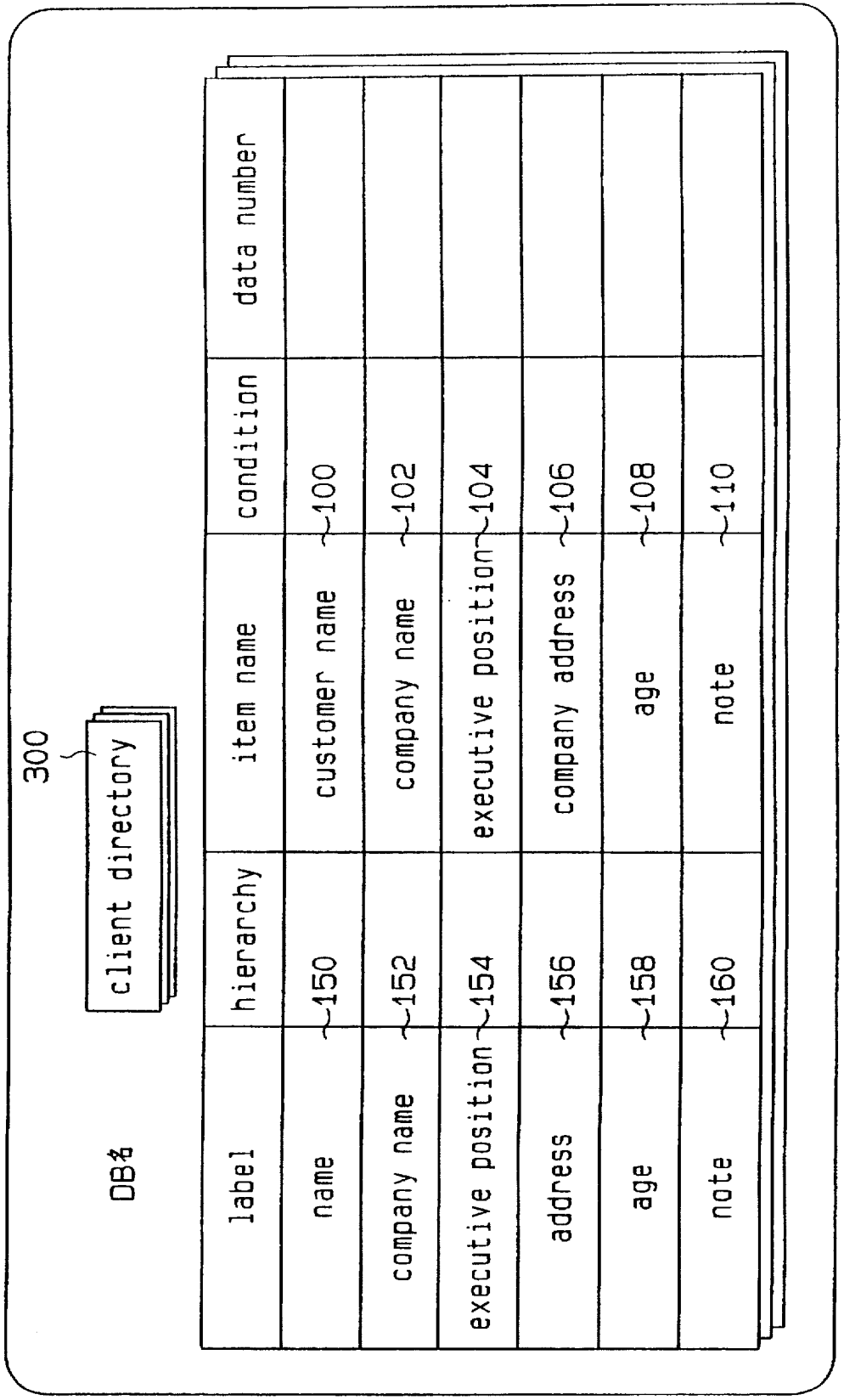
FIG. 25 is a diagram illustrating a table containing various labels and items used in a database according to the present invention.
Figure 28:
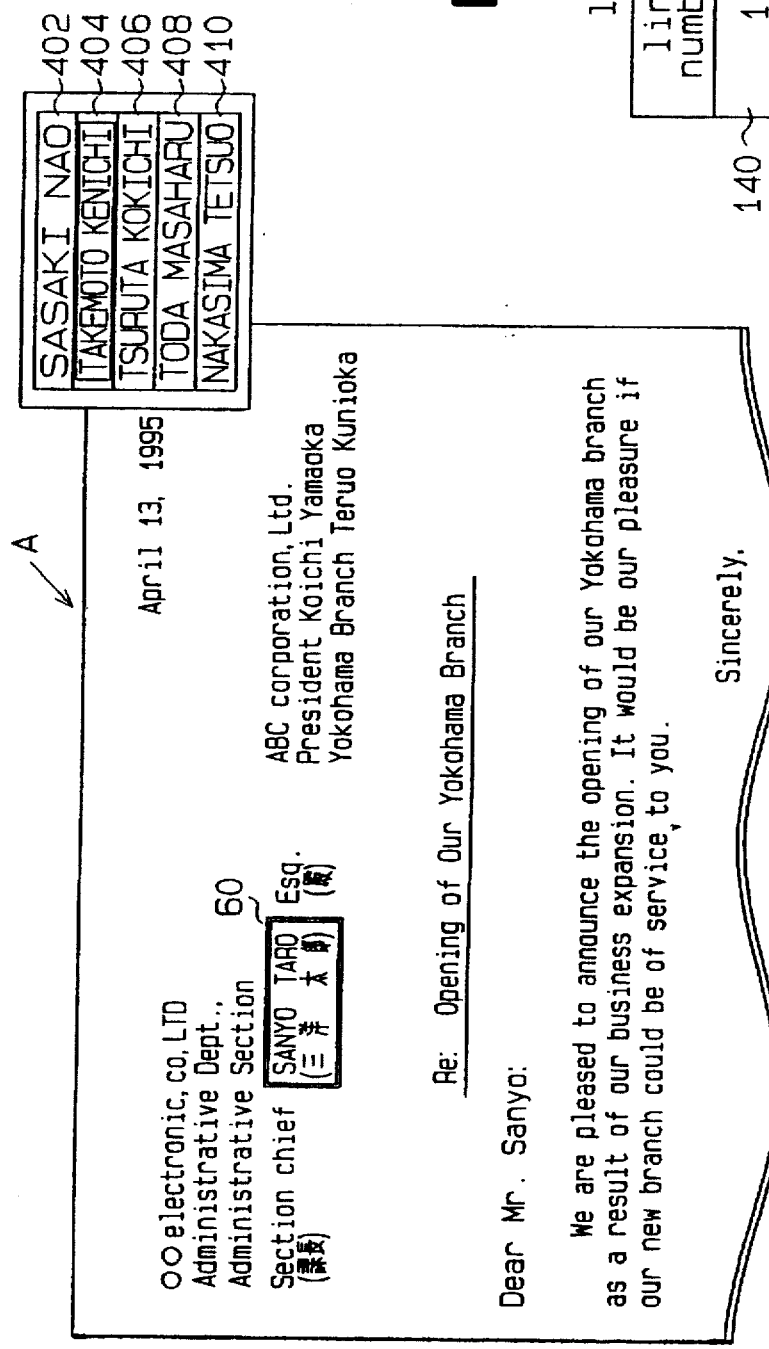
FIG. 28 is a diagram illustrating a document and a selection of replacement words as would be displayed on a computer monitor.
Figure 29:
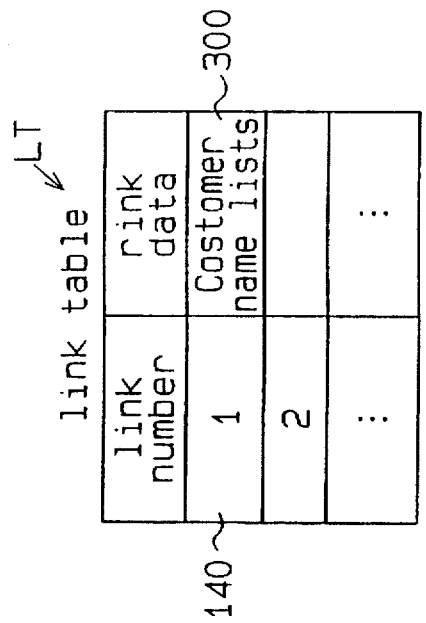
FIG. 29 is a diagram illustrating a link table.

The data storage 13 stores the user defined database and a plurality of tables (or cards) ED, as shown in FIGS. 25 and 26. Each card contains at least two field columns defining the relationship between data contained in database DB and data contained in the dictionary DT. A first field column includes six items 100, 102, 104, 106, 108 and 110 defining the headings of specific records 130 contained in the database DB, while a second field column includes six labels 150, 152, 154, 156, 158 and 160, each of which is a portion of records contained in the dictionary DT. Each of the items 100 to 110 is related to a corresponding label 150 to 160, as for example, the item "customer name" 100 to the label "name" 150. In other words, each card ED defines the relationship between the items 100 to 110 and the labels 150 to 160. The card ED further contains a card title 300 which distinguishes it from other cards ED. In response to a request from the processor 8, the database manager 12 reads the parameters defines by table ED and the records contained in database DB. The data link storage device 15 contains a link table LT. The link table LT stores card title data 300 as link information, and link number data 140 which corresponds to the title data 300, as shown in FIG. 29. The link data manager 14 manages the title data 300 and link number data 140.

Figure 33:
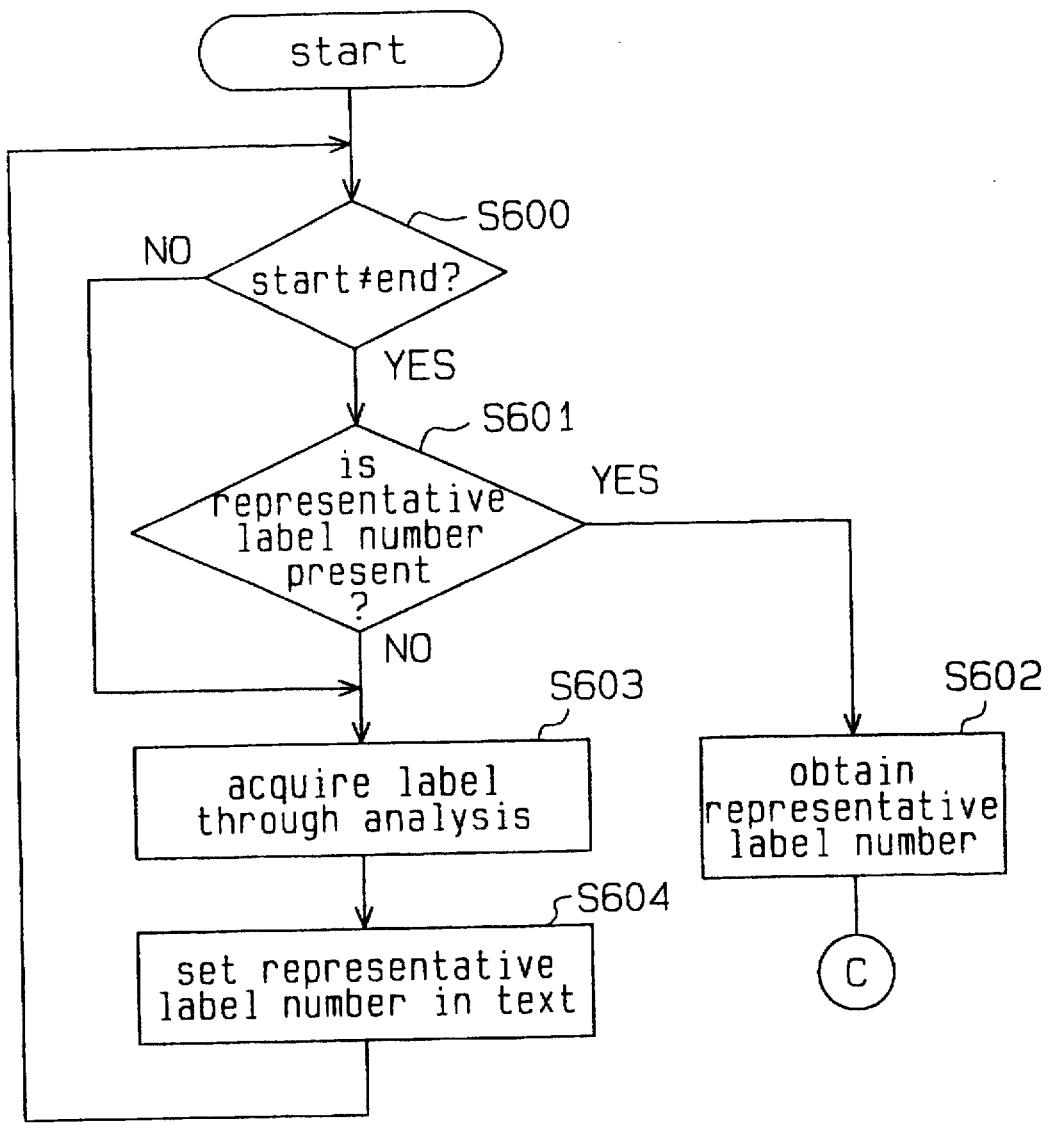
FIG. 33 is a flowchart illustrating a sequence of processes used in a first control program according to the present invention.
Figure 35:
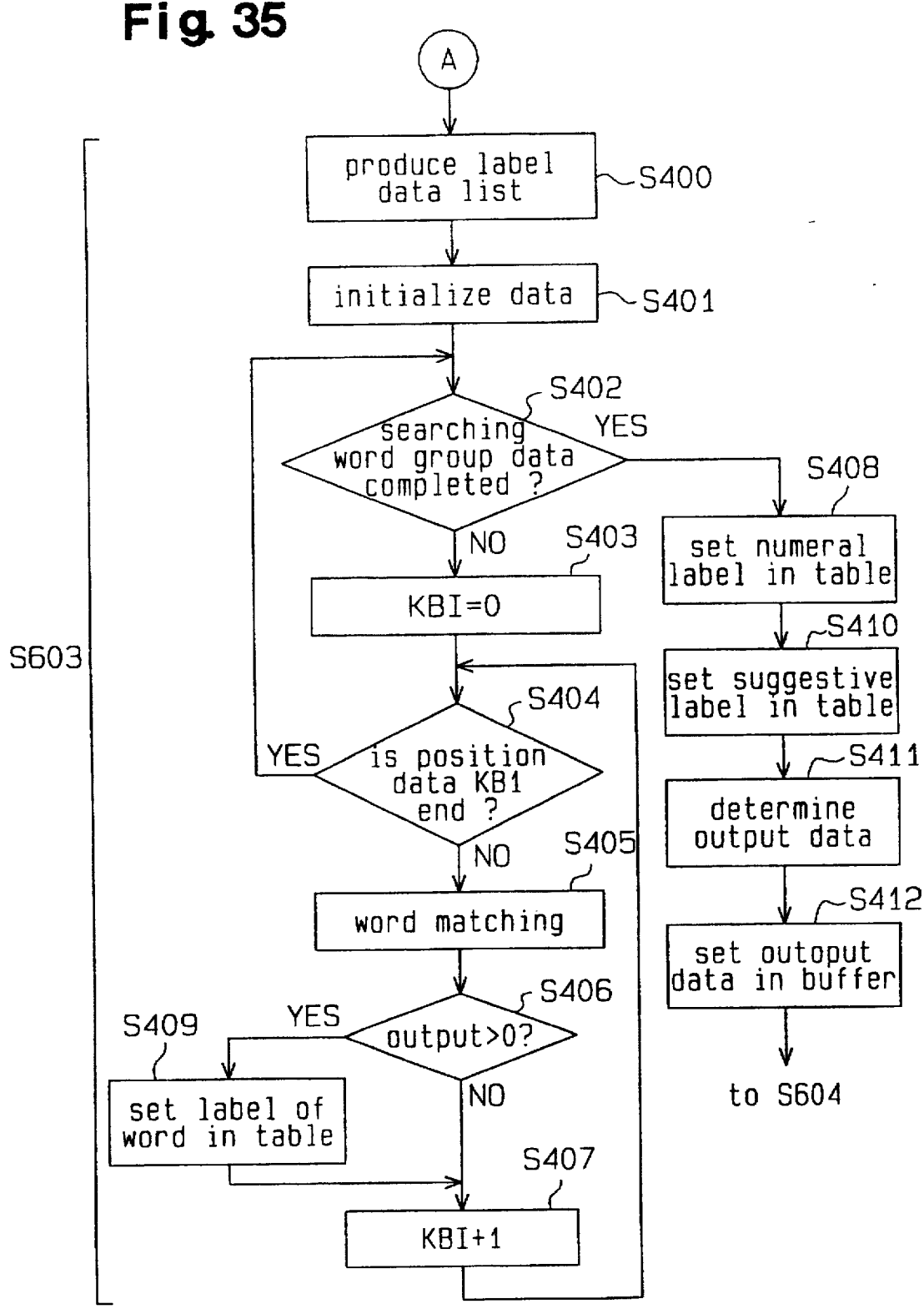
Figure 36:
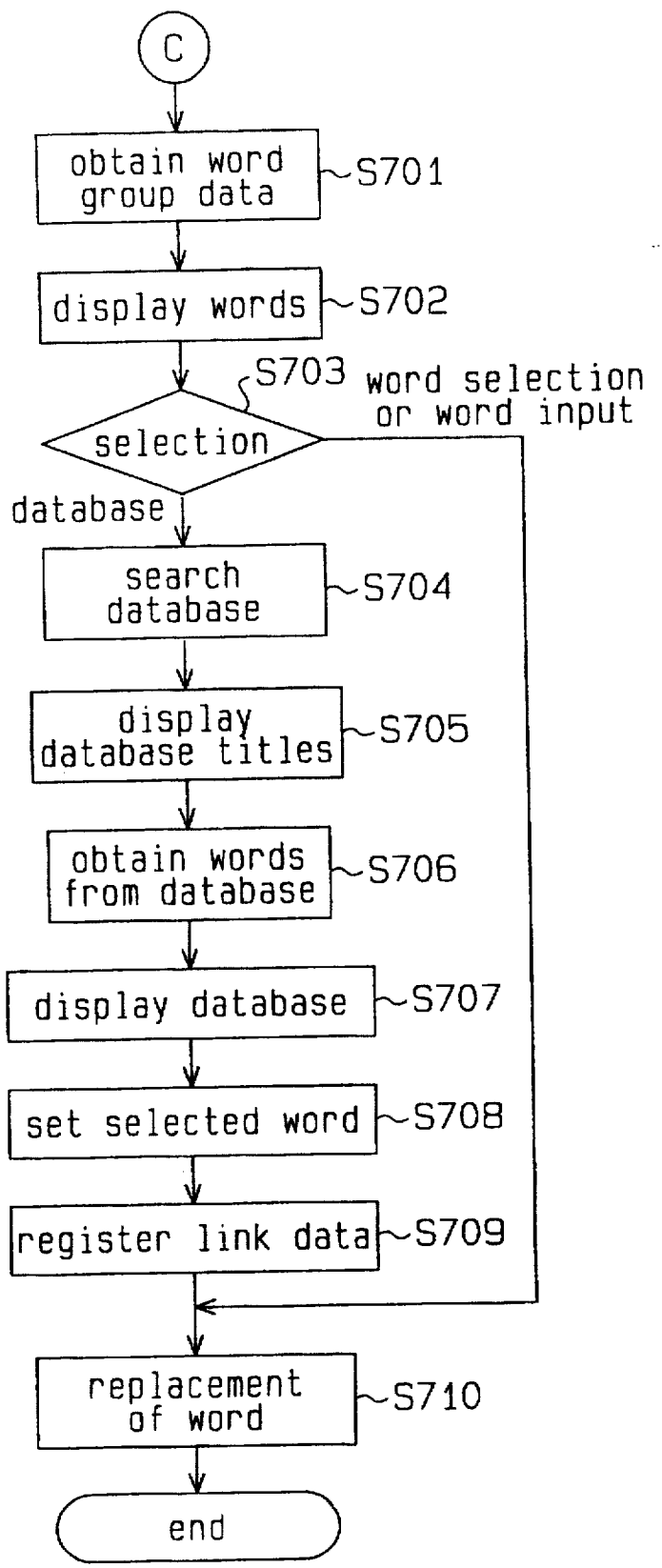
FIG. 36 is a flowchart illustrating a sequence of processes used during execution of a second control program according to the present invention.

The aforementioned sections 6 to 12 and 14 operate in accordance with three programs executed by the processing unit 50. The first program, illustrated by the flowcharts in FIGS. 33 to 35, executes the steps S600, S601, described at steps S603 and S604 and a subroutine at step S603 includes steps S300 to S306 or steps S400 to S412. The second program executes the routines shown at steps S600, S601 and S602, as illustrated in FIG. 33, and the steps S701 to S709, as illustrated in FIG. 36. The third program executes a change in a label associated with a particular word in a document.

The operation text replacement, according to the present invention, will now be described. Should the computer operator decide to change a word or character in an open document A the user has one of two methods available to select a character or word via the input device 2. According to the first method, the user defines the first character 60a in a word 60 by manipulating the arrow keys, as shown, for example, in FIG. 2. The I/O controller 1 stores the position data (row "4" and column "5") of the cursor CS in the first buffer B1 shown in FIG. 4. The same data is stored in the second buffer B2 using the START and END table arrangement, shown in FIG. 5A. The text manager 4 receives the coordinates of the cursor CS from the I/O controller 1 and sets the ATT data associated with the character 60a above the cursor CS to "1" as shown in FIG. 6. The highlighted character 60a is then displayed as shown in FIG. 2.

Figure 19:
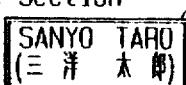
FIG. 19 is a diagram showing a document displayed on a computer monitor.

According to the second method, the user manipulate a function and arrow key to select the first and last characters 60a, 60b of the word 60 as shown in FIG. 2 and 3. The I/O controller 1 stores the coordinates of the first character (row "4" and column "5") in the record START and the coordinates of the last character (row "4" and column "8") in the record END. Both records are stored in the second buffer B2 with an arrangement as shown in FIG. 5B. The text manager 4 sets the attribute flag ATT to "1" based on the existence of coordinate START data and END data in the second buffer B2, as shown in FIG. 18. The program then outputs the highlighted word 60 to the display 3, as shown in FIG. 19.

When the user operates the input device 2 to edit a word after one character is defined by the first method, the I/O controller 1 sends the coordinates of the START and END data "4, 5" shown in FIG. 5A to the processor 8. When the user operates the input device 2 after a word is defined by the second method, the I/O controller 1 sends the coordinates of the START data "4, 5" and the END data "4, 8", as shown in FIG. 5B, to the processor 8.

Process According to First Control Program

FIG. 33 is a flowchart illustrating the sequence of processes executed by the processor 8. At step S600, the processor 8 compares the START and END data stored in the second buffer B2, as shown in FIG. 5A. When the user highlights a word by the second method, the START and END data do not correspond, therefore the processor 8 proceeds to step S601. Upon detecting the presence of a representable label number associated with the word 60 in the text data in step S601, the processor 8 moves to step S602. Should a representative label number not exit; the processor 8 moves to step S603 to read character code data from the text data storage device 5. The processor 8 then produces analysis data as shown in FIG. 7 for the analyzer 9. The product of this analysis, i.e., analysis data includes defined word data, word group data and word position data. The word data corresponds to highlighted word 60 and is formed with character code data. Using the START and END data, the processor 8 defines character code data for 30 characters proceeding and following the highlighted word. That is, based on the coordinates for the first and last highlighted character, the processor defines the word group data. The word group data contains individual character code data, shown in FIG. 7 as words 58,60 and 62. The word group data also includes the space or spaces between each word. Word group data may be defined with punctuation marks before the START position and after the END position to indicate word separation. Word position data indicates the position of the first character 60a of the word 60 in the word group data.

Figure 34:
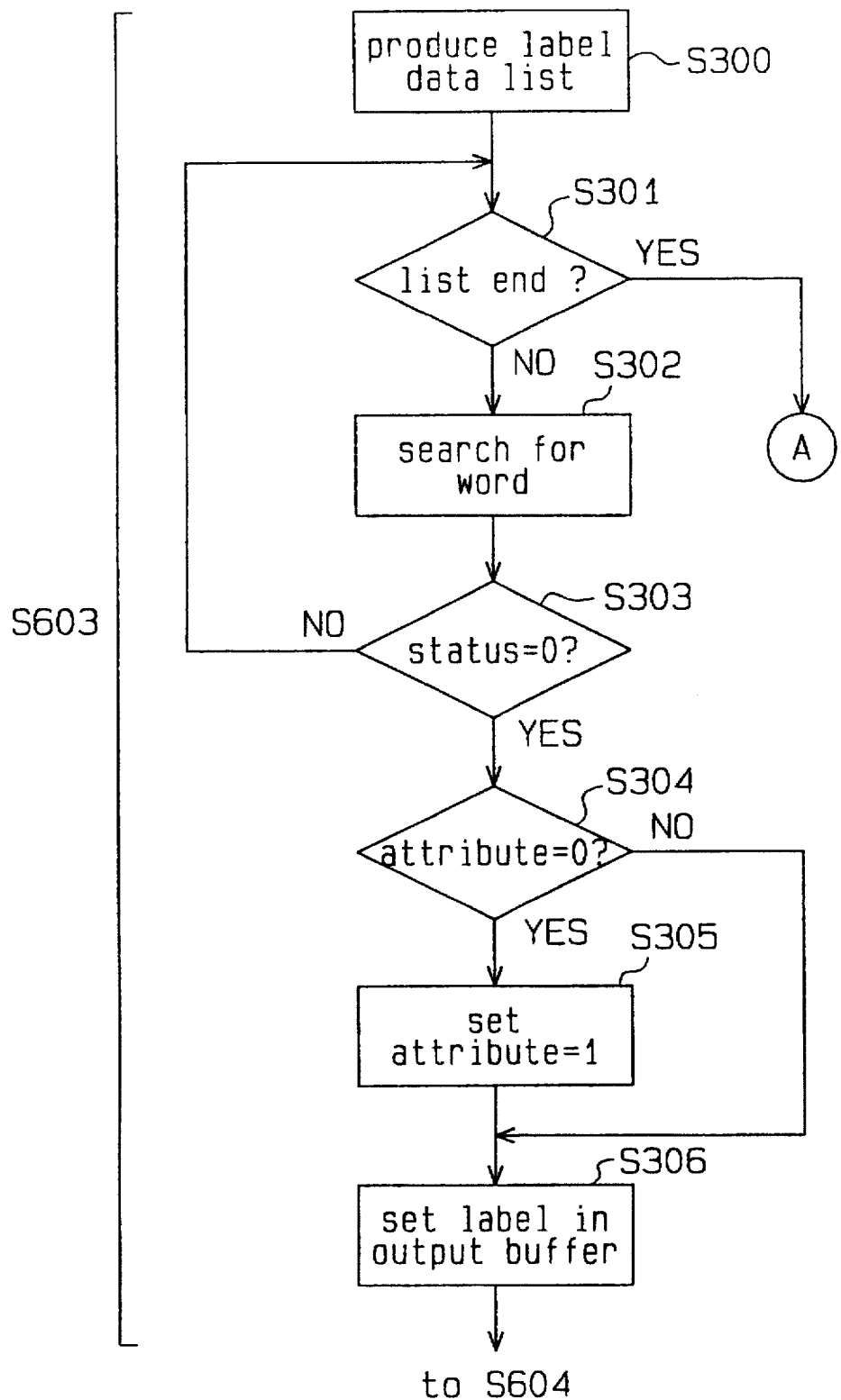
FIGS. 34 and 35 are flowcharts illustrating a sequence of processes executed during operation of the text editor according to the present invention.

When the user defines a word by the first method, the START and data END coincide at step S600. Consequently the processor 8 proceeds to step S603, where it produces the above-mentioned analysis data. At step S603, the defined word data is set to "φ" which indicates no word data. The word group data and word position data are the same as those shown in FIG. 7. The data transfer section 6 provides the analysis data to the analyzer 9. FIGS. 34 to 36 present flowcharts illustrating the sequence of processes executed by the analyzer 9. Initially, the words 70, 72, 74, 76, etc. the labels 78, 80, 82, 84 etc., and corresponding attribute values are stored in the dictionary DT, as shown in FIG. 8A. The attribute value "0" indicates that labels have previously been set in the dictionary DT. An attribute value "1 " is set by a label setting process executed by the processor 8 and by a process performed by the user. The label data list ML stores the attribute data "1" and/or "0" as shown in FIGS. 9A and 9B.

(I) First Process Executed by Analyzer

FIG. 34 presents a flowchart illustrating a first sequence of processes the analyzer 9 executes in step S603 when a word is defined using the above-described second method. In step S300, the analyzer 9 receives analysis data and requests the dictionary manager 11 to provide a label data list. In response to the request, the dictionary manager 11 uses the dictionary DT to produce a label data list ML containing labels 78, 82, 88, 99 etc. paired with the attribute value "0" as shown in FIG. 9A. The dictionary manager 11 then provides the list ML to the analyzer 9. Following this, analyzer 9 executes the routines described at steps S301, S302 and S303. The program will continue looping through these routines as long as the status flag at step S303 is set to "1" and the program has not reach the end of the list as shown in FIG. 39. When the program reaches the end of the list, the program advances to S400 where it produces a label data list, as shown in FIG. 3. If a matching word is in the dictionary, the analyzer 9 provides the dictionary manager with label(e.g.,label 78 "executive position"), the attribute "0" and the word 60. The manager 11 searches the dictionary DT for the word which completely matches the word 60. The dictionary manager 11 sets the status to "0" when there is a matching word, and sets the status to "1" when there is no matching word. When "1" is detected, the analyzer 9 proceeds to step S301. Once the dictionary manager moves to step S302, the manager 11 searches the dictionary DT as mentioned above using the label 82 "title of respect", the attribute "0" and the word 60 received from the analyzer 9. When no matching word results, after execution routines S301, S302 and S303, the dictionary manager 11 sets the status to "1", and, the analyzer 9 proceeds to step S400.

When a matching word is found in the dictionary DT, the routine at step S303 produces a status indication of "0" and the routine at step S304 determines whether the attribute value of the matching word in the dictionary DT is "0". When the attribute value is zero, the analyzer 9 then resets the attribute value to "1" at step S305 and obtains the label corresponding to the matching word from the dictionary DT at step S306. The analyzer 9 produces the position data "3" indicative of the position of the first character 60a of the word 60 in the word group data as shown in FIG. 7. The position data will hereinafter be called "FROM data". The analyzer 9 also produces data indicating the position following the last character 60b of the word 60. This position data will hereinafter be called "NEXT data". The analyzer 9 then stores the label of the matching word from the dictionary DT, FROM data "3" and NEXT data "7"0 into its own output buffer (not shown). In the first process, therefore, the analyzer 9 can acquire a label associated with a highlighted word when a word matching with the highlighted word is found in the dictionary DT.

(II) Second Process Executed by Analyzer

FIG. 35 presents a flowchart illustrating a second sequence of processes the analyzer 9 executes in step S603 regardless of whether the first or second method is chosen. At step S400, the analyzer 9 executes the same process executed at step S300, and receives the label data list ML from the dictionary manager 11. At step S401, the analyzer 9 initialize all data available from a table KT, as shown in FIG. 10. Table KT contains FROM data, NEXT data, label data, attribute data and status data, all of which are initially set to "0". Next, the analyzer 9 checks, at step S402, whether the word group data search is completed. When the search has not yet been completed, the analyzer 9 goes to step S403 to set data KBI to "0". Data KBI represents the position of the first character in the word group. In S404, the analyzer 9 compares this position data KBI with the position data of the last character in the word group ("8" in this case).

When the KBI and last character position data diverge, the analyzer 9 sets the KBI characteristic of the words 58, 60 and character 62 to "0". The analyzer 9 supplies those words, the label 78 "executive position" and attribute "0" all of which are contained in the label data list ML shown in FIG. 8, to the dictionary manager 11. The manager 11 then searches the dictionary DT to find a word 70 associated with the label 78 and that coincides with the word 58. The manager 11 outputs the word 58, label 78 and attribute "0" as matching data to the analyzer 9. Upon detecting matching data from the manager 4 at step S406, the analyzer 9 proceeds to S409. If no matching data is detected, the analyzer proceeds to S407. At step S409, the analyzer 9 sets the FROM data "0", NEXT data "2" and label 78 "executive position" associated with the word 58, in the table KT as shown in FIG. 11. Following this, the analyzer 9 adds "1" to position data KBI, yielding KBI=1, in step S407 and proceeds to step S404. At step S405, the analyzer 9 assigns a KBI characteristic of 1 to the words 58B, 60 and to the character 62, as shown in FIG. 7. The analyzer then proceeds to search the dictionary DT with respect to those words. When the routines at steps S404 to S407 and step S409 cause KBI to change to "9", the analyzer 9 proceeds to step S402 via step S404. At this time, the label 78 "executive position" and label 84 "title of respect" are set in the table KT as shown in FIG. 12. When the search for a word in a word group is completed, the analyzer 9 proceeds to step S408.

Should a number character be present in the word data at step S408, the analyzer 9 sets the word containing a numeral to a "number-containing" word in the table KT. Suppose, for example, that the words "the 12th" occur as word data. The analyzer 9 would then treat both words as one word "the 12th" as one character. The analyzer 9 would then store the label "numeral" and an attribute "0", as associated attribute of the number-containing word in the table KT. At step S410, the analyzer 9 identifies a label of the highlighted word by using the label in the table KT in accordance with a label associational analysis program. More specifically, the analyzer 9 infers a label 86 "name" for the highlighted word 60 by using the label 78 "executive position" and the label 84 "title of respect". This label 86 "name" represents the suggested meaning or semantics of the defined word 60, due to its location between the word 58 defined by label 78 and word 52 defined by label 84. The label associational analysis program has multiple rules or statements allowing it to associate a label with a word in a document based on the labels of surrounding words. For example, this program would treat the label "name" as inferred from existing label "executive position". Similarly, if the label "executive position" existed, the program could infer the label "title of respect". The analyzer 9 sets the suggested label 86 "name", FROM data "3", NEXT data "7", attribute "0" and STATUS data "1" of the word 60 as parameters in the table KT, as shown in FIG. 13.

Using word position data "3", the analyzer 9, at step S411, examines the FROM data in the table KT for data identical or similar to "3", i.e. "2" or "4", the record(s) containing these values are ranked in priority and treated as output data shown in FIG. 14.

Three other methods may also be used to acquire the output data. The first method is to identify record(s) having status values of "1" as output data from the table. The second method selects consecutive words having distinct labels and examines the FROM and NEXT data of these words in the table. When two labels have identical values in the FROM and NEXT data, the FROM and NEXT data, those labels and their associated attribute and status data are treated as output data. In the third method, the analyzer 9 examines the FROM and NEXT values in each individual label for the largest difference in values. For example, as shown in FIG. 13, the largest difference in the FROM and NEXT data, is from "3", to "7". Consequently, the FROM and NEXT data, the label and its associated attribute and status data are treated as output data.

At step S412, the analyzer 9 stores the FROM data "3", NEXT data "7"0 and label 86 "name"0 as output data in its own output buffer. The analyzer 9 identifies the label most similar to the highlighted word by reference to dictionary DT in the second process. This is what is meant by inferring a label from the labels used for words surrounding the highlighted word. In effect, this method utilizes what is known as an inference engine. This scheme permits the inference of a label for a highlighted word even if this label is not located in the dictionary DT.

(III) Setting of Representative Label Number to Text

Step S604, shown in FIG. 33 is a routine the label data manager 7, processor 8 and dictionary manager 11 execute after the steps S306 or S412. At step S604, the data transfer section 6 receives the output data from the analyzer 9 and transfers it to the label data manager 7. The label data manager 7 searches the label managing table MT1 for the label 86 "name". When this label 86 is found, the label data manager 7 stores the label number associated with it into the number managing table MT2. When a label is not found, the label data manager 7 produces a new label number "100", and stores the label 86 "name" and the label number "100" into the label managing tables MT1 and MT2, as shown in FIG. 15B. Further, the label data manager 7 produces a representative label number "10", associated with the label number "100", stores it in table MT2 and provides it to the data transfer section 6. The label data manager 7 supplies the representative label number "10", FROM data "3" and NEXT data "7" to the processor 8 via the data transfer section 6.

The processor 8 determines the position of the word 60 in the text from the column data "5", the word position data "3", the FROM data "3" and the NEXT data "7". More specifically, the processor 8 subtracts the word position data "3" from the column data "5", and adds the difference "2" to the FROM data "3" and to the NEXT data "7". The result is column data "5" for the first character in the word 60, and the next column data "9" for following the last character. Further, the processor 8 computes the START data "row '4' and column '5'" for the first character in the word 60, and the END data "row '4' and column '8'" for the last character. This latter computation is based on both the column data "5" and "9" and the punctuation number in the text data. The processor 8 supplies the computed text position data of the word 60 and the representative label number "10" to the text manager 4. The manager 4 writes this label number "10" in the associated text data memory area in the storage 5 as shown in FIG. 17. The label data 86 of the defined word 60 can be included as the representative label number "10" into the text data in this manner. Further, the manager 4 assigns the value of "1" to the four ATTs associated with the word 60. As a result, the display 3 highlights the word 60 in the document A, as shown in FIG. 19. When the START data and END data in the second buffer B2 coincide, as shown in FIG. 5A, the processor 8 stores "row '4' and column '5'" in the START Record of B2 "Row '4' and column '8'" are likewise stored in the END Record of B2 as shown in FIG. 5B.

Figure 20:
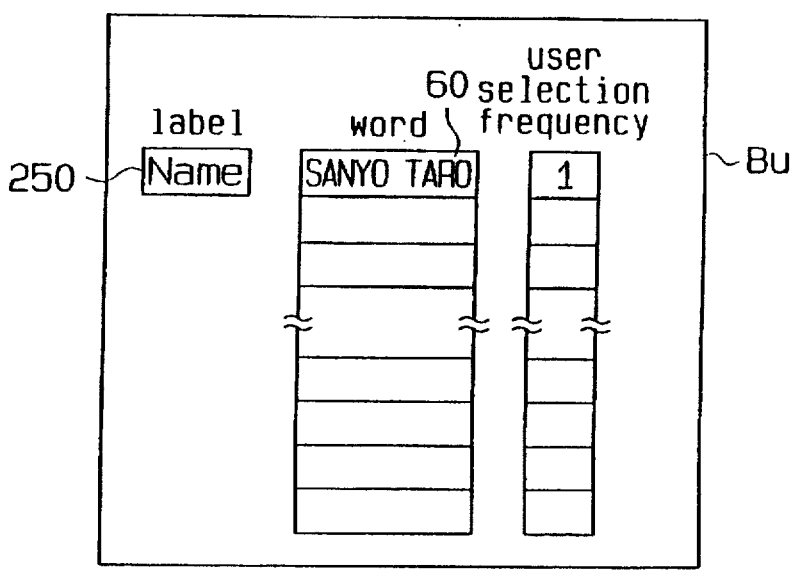

The processor 8 then sends the word 60 and the label 86 "name" to the dictionary manager 11, which in turn assigns both to the dictionary DT and sets the attribute to "1" as shown in FIG. 8B. The processor 8 also places the word 60 and the user selection frequency value (USFV) "1" both of which correspond to the label 250 "name", in the buffer Bu. This label 250 in FIG. 20 is the same label as label 86 "name" shown as output data in FIG. 14. FIG. 21 is one example of the organization of word group data also set in the buffer Bu. The processing of this data will now be described.

When the user highlights the word 202, the label "name" is identified. The dictionary manager 11 searches the buffer Bu for the word 202. When the word 202 is found, the manager 11 replaces the its USFV score or values, previously "8", with the new number "9" as shown in FIG. 22A. The manager 11 also arranges the words in the descending USFV order, here "9" is the second value listed, since it is less than "10". Since, after highlighting, the USFV score for the word 202 is here shown as 9 and that for the word 200 is "10", in this case, the words 200, 202 are not rearranged. In other words, the manager 11 ranks the words in order of their decreasing USFV score.

In another example, the maximum amount of data may be stored in the buffer Bu as shown in FIG. 22A. When the user defines a word not stored in the buffer Bu, but which is in the dictionary DT or which can be inferred by the inference engine, the manager 11 clears the word having the least significant USFV score from the buffer Bu. As shown in FIG. 22A, the buffer manager would clear word 210. Word 210 is replaced with word 212 in the buffer Bu. The replacement position of the new word depends on the number of words containing USFV scores identical to the new word. For example, as shown in FIGS. 22A, 22B, since there are 3 words having USFV scores of "1" when word 210 is replaced with word 212, the latter is ranked as the first word among three having USFV scores of 1. This scheme permits the buffer Bu to accommodate new word entries. Finally when the routine at step S604 is finished, the processor 8 returns to step S600.

Process According to Second Control Program

The second control program used in the present invention will now be described. The second control program includes a first and a second sequence, first sequence carried out following the first control program. The second sequence starts when the user operates the input device 2 to initiate word replacement using the above-described second method. At step S600, the processor 8 compares the START data and END data in the second buffer B2. The START data, "row '4' and column '5'" and END data "row '4' and column '8'" are stored in the second buffer B2. The processor 8 then determines that a distinction exists between the START and END data, and proceeds to step S601. When detecting the presence of the representative label number "10" in the text data in step S601, the processor 8 supplies it to the label data manager 7 in step S602. The label data manager 7 then searches for label number "100" among the label designated by the representative label number "10". This is done by referring to the number managing table MT2 shown in FIG. 16B. When there are a plurality of label numbers associated with the representative label number, the manager 7 will select only one. The label data manager 7 then searches for the label 86 "name" associated with the label number "1100", by referring to the label managing table MT1 shown in FIG. 15B. The label "86" is then provided to the processor 8. Since a label is identified by referring to an associated label number, it is not necessary to use the dictionary DT for the purpose of identifying a label.

(I) Word Replacement

FIG. 36 presents a flowchart illustrating a sequence of routines executed by the processor 8, dictionary manager 11, display controller 10, database manager 12 and link data manager 14. At step S701, the processor 8 supplies the address of its output buffer to the dictionary manager 11 in order to receive words associated with a particular label. The dictionary manager 11 reads all words 200, 202, 204, 206, 208, 212 etc. associated with a label 250 "name" from the buffer Bu. One example of this is shown in FIG. 22B. The dictionary manager 11 provides each of these words to an output buffer 8a of the processor 8, as shown in FIG. 23. At step 23, the processor 8 supplies the words set in the output buffer 8a to the display controller 10. The display controller 10 controls the display 3 to display a window 23. Window 23 includes the first and second columns 20 and 21, the select key 22. The words 200, 202, 214, 216 and 218 are displayed in the first column 20, as shown in FIG. 24. This display controller 10 is capable of scrolling the display screen of the words in the first column 20 in accordance with the user's operation of the input device 2. The words shown in the first column 20 appear in order of their USFV ranking as indicated by the dictionary manager 11. This is shown in FIG. 24, as described earlier. This function can eliminate the user's scrolling operation to search out words which the user frequently selects.

When the user operates the input device 2 to select any of the above display selections, the display controller 10 controls the display to show the process selected by the user. In the first selection the user selects one of the displayed words. To indicate selection of a word by the user, the display controller 10 registers the selected word and its status information in the display controller's buffer. In the second selection, the user inputs a word in the second column 21. The display controller 10 registers the input word and the status as having been selected in the buffer. In the third selection, the user selects the select button 22, which causes the controller 10 to register its selection in the buffer. The display controller 10, then supplies the status associated with any of the three selections to the processor 8. At step S703, the processor 8 checks which one of the three selections the user chosen, based on the status information stored in its buffer.

The processor 8 next supplies the selected word to the text manager 4 at step S710. The text manager 4 replaces the character code of the word 60 with that of the selected word in the text data storage 5. The replacement is based on START data "row '4' and column '5'" and the END data "row '4' and column '8'" of the defined word 60. As a result, the defined word 60 is replaced with the newly selected word. According to this embodiment, therefore, the user can edit a document by simply defining a word in a document and selecting a desired word from among words displayed in the first column 20 via the input device 2. This helps the user to prepare a document to reduce the user's time and efforts to edit words.

When determining that the second selection (inputting of a word), the processor 8 supplies the input word to the text manager 4 and the manager 4 replaces the defined word 60 with the input word. This allows the user to input a word choice even though the choice is not displayed. Further, when determining that the third selection (the selection of the select button 22), the processor 8 proceeds to step S704.

(II) Replacement of Word Using Database

At step S704, the label 86 and the address of the output buffer are supplied to the database manager 12. The database manager 12 searches all the database managing tables for the table having the same label as the label 86 "name". In this case, for example, a plurality of tables ED (other tables are not shown) having the identical label 110 and 86 are found from the database storage 13, as shown in FIG. 25. The database manager 12 sets the database titles of each managing table into the output buffer of the processor 8. At step S705, each database title in the output buffer is provided to the display controller 10. The display controller 10 discontinues the display of the words supplied from the dictionary manager 11 (see FIG. 24), and in their place, displays the five titles 300, 302, 304, 306 and 308 as shown in, for example, FIG. 27. When the user operates the input device 2 to select the title 300 "client directory" the display controller 10 sets the selected title 300 in the buffer of the processor 8. As another process, when finding one database managing table (i.e., a database title) from the database storage 13, the processor 8 proceeds to S706 without supplying one title to the display controller 10. When there is one title, therefore, that title is not shown on the display 3.

At step S706, the processor 8 supplies the selected title 300, the label 86 and the address of the output buffer to the database manager 12. The database manager 12 specifies an item 100 "client name ", associated with the identical label 110, that contains the title 300 from the database manager ED. Further, the manager 12 finds words 402, 404, 406, 408 and 410 associated with the specified item 100 from the database DB as shown in FIG. 26 and sets them in the output buffer of the processor 8. At step S707, the processor 8 supplies the words to the display controller 10. The display controller 10 discontinues displaying of the titles (see FIG. 27) and brings displaying the words 402, 404, 406, 408 and 410, as shown for example in FIG. 28. When the user operates the input device 2 to select the word 404 under the above display condition, the display controller 10 sets the selected word 404 in the buffer of the processor 8. At step S708, the processor 8 supplies the word 404 and the label 86 to the dictionary manager 11. The dictionary manager 11 then sets the word 404 associated with the label 200 in the buffer Bu.

At step S709, the processor 8 supplies the database title 300, "client directory", selected by the user, to the link data manager 14. The manager 14 stores the title 300 as link data in the link table LT, as shown in FIG. 29. Further, the manager 14 produces a link number value "1" 140, associated with the title 300, and stores it in the link table LT. Link number value "1" is also supplied to the text manager 4. The text manager 4 sets the link number "1" in the memory of the text data storage device 5. This is the process by which the text data T is linked to data in the database. At step S710, the processor 8 supplies the word 404 to the text manager 4. The text manager 4 first clears the character code from the defined word 60 from the text data storage device 5, and then enters the character code of the selected word 404 into text data T. Consequently, the defined word 60 is replaced with the selected word 404. FIG. 30 illustrates revised text data T containing replaced character code data for word 404. FIG. 31 illustrates the document A after replacement of the words shown on the display 3. The display 3 provides the highlighted display of the replaced word 404. As apparent from the above, this embodiment can display not only the words 200, 202, etc. supplied from the dictionary manager 11, but also the words 402, 404, etc. supplied from the database storage 13. This allows the user to choose words from a greater word selection, and consequently reduces the number of words the user needs to input.

Routine Skipping When Link Number Data Exists

A description will now be given of the routine that occurs when link number data associated with the defined word is previously set to "1". When detecting that the link number is set to "1" in step S602, the processor 8 acquires the link number "1" via the text manager 4 and supplies it to the link data manager 14. The manager 14 reads the database title 300 "client directory" associated with the link number 140 "1" from the link table LT in the link data storage 15, as shown in FIG. 29, and supplies it to the processor 8. The processor 8 skips steps S701 to S705, and supplies the title 300, the label 86 and the address of the output buffer to the database manager 12. The sequence of processes starting at step S706 is performed in this manner. When a link number exists in the text data, words associated with the label 86 can be obtained from the database storage 13 and quickly displayed by skipping the routines at steps S701 to S705.

Alteration of Label According to Third Control Program

A description will now be given of how the user can selectively change a label for a word while editing text. Assume that text data T as shown in FIG. 30 is stored in the text data storage device 5 and that the document A associated with the text data T as shown in FIG. 31, is displayed on the display 3.

Figure 32:
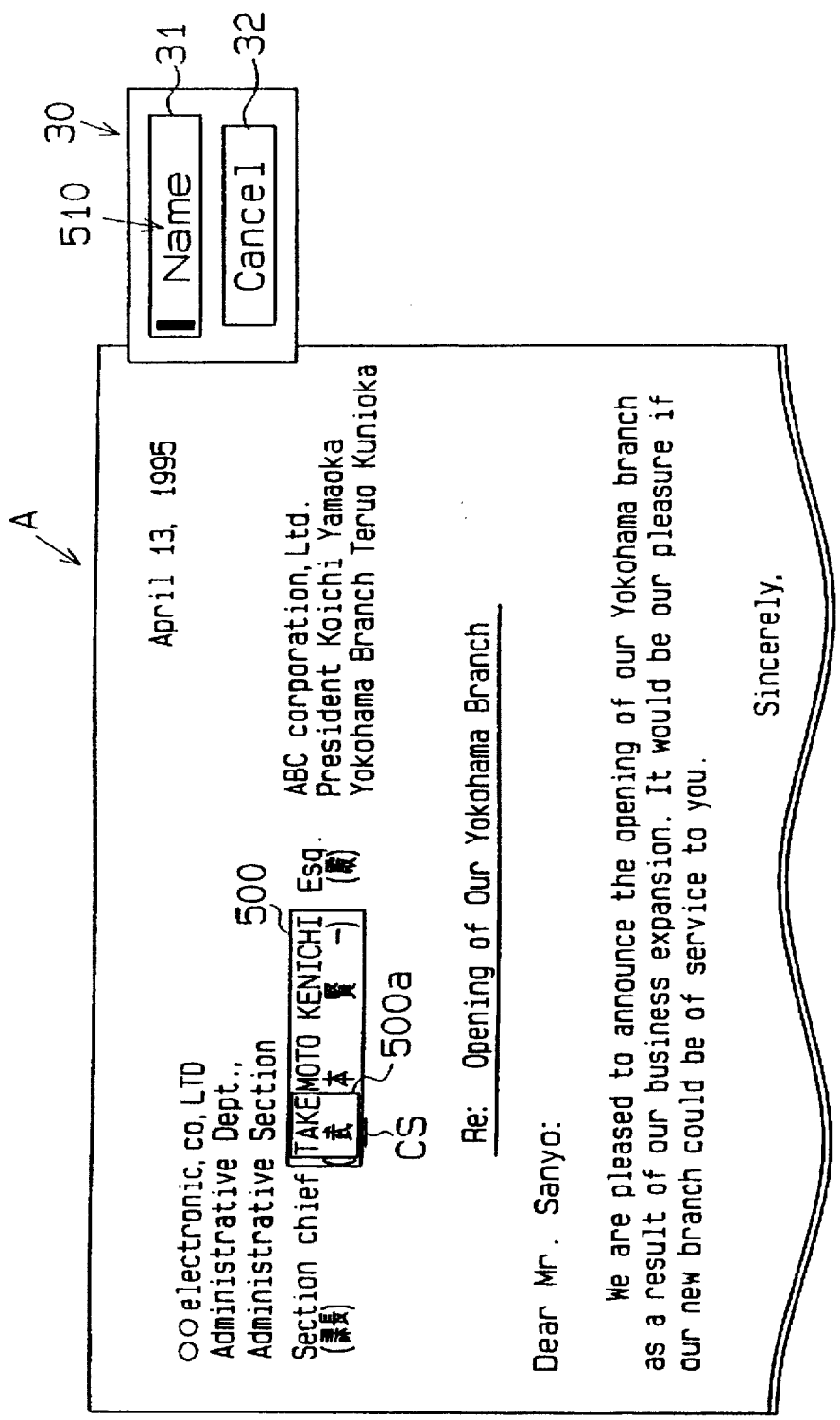
FIG. 32 is a diagram illustrating the appearance of a document and a filed window.

For example, the user moves the cursor CS by the input device 2 to define the first character 500a of a word 500. The user then manipulates a key on the keyboard or a button on the mouse of input device 2 to change the label, as shown in FIG. 32. In response to the key operation, the I/O controller 1 reads the character codes and representative label number of the word 500 from the text data storage 5 via the text manager 4, and supplies them to the data transfer section 6 via the processor 8. The data transfer section 6 supplies the representative label number "10", to the label data manager 7 and performs the same process as done in step S602 to acquire the label "name". The transfer section 6 further controls the display 3 to output a window 30 having of a column 31 and a cancel key 32 and to display a label 510 in the column 31, as shown in FIG. 32. With the label 510 displayed, the user can input the word, by operating the input device 2, in the column 31. When the user inputs a new label "boss'name" which can replace the label 510, the transfer section 6 displays it and supplies the word 500, the label 510 and the input label to the dictionary manager 11. The manager 11 first checks if there is a label in the buffer matching the label 510. If such a label is detected, the manager 11 checks if there is a word associated with that label, which matches the word 500. When a match is detected, the manager 11 clears the word and supplies the input label "boss'name" and the word 500 to the buffer. Should no match be detected, the manager 11 supplies the input label and the word 500 to the buffer.

Should the dictionary DT previously contain a word and label that match word 500 and label 510, the manager 11 clears the label and supplies the input label to the buffer. At this time, without clearing the label, a pair of the word 500 and the input label may be registered in the dictionary DT. When detecting no matching label or word, the manager 11 resets the word 500 and the input label in the dictionary DT. At the time of the resetting of the word and label, the manager 11 assigns a value of "1" to the associated attribute. This assignment process is called manual label setting. After data has been supplied to the buffer Bu and the dictionary DT, the dictionary manager 11 supplies the input label to the label data manager 7 via the data transfer section 6. The manager 7 produces, for example, a representative label number "11" and supplies it to the processor 8 via the data transfer section 6 in the same way as in step S604. The processor 8 stores the representative label number "11" associated with the word 500, in the memory of the text data storage device 5 via the text manager 4. In this manner, the user can selectively change the label of a word.

Although only one embodiment of the present invention has been described herein, it should be apparent to those skilled in the art that the present invention may be embodied in many other specific forms without departing from the spirit or scope of the invention. Particularly, it should be understood that this invention may be embodied in the following forms.

Figure 37:
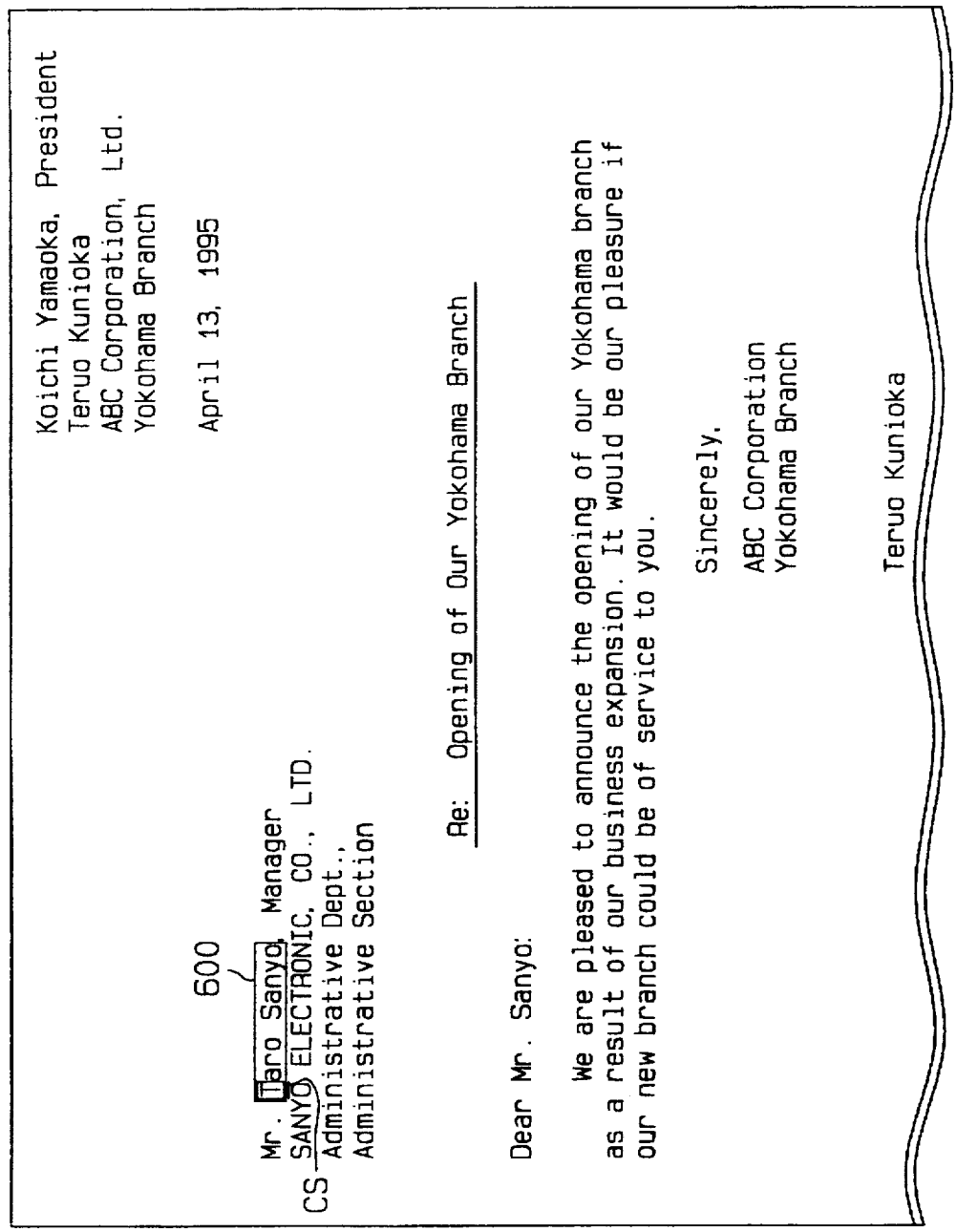
FIG. 37 is a diagram illustrating the appearance of an English letter on a display according to another embodiment of this invention.

The text editor embodying this invention may be adapted for multilingual word processing on dedicated word processors or on personal computers. For example, when the user defines a word 600 in an English letter as shown in FIG. 37, words 700, 702, 704, 706 and 708 with labels identical to the word 600 are shown on the display, as shown in FIG. 38. Should, for example, the user select the word 702 from the displayed list of words, the word 600 would be replaced with the word 702, as shown in FIG. 39. In this case, although the word 600 is a full name consisting of first name "Taro" and family name "Sanyo", the full name is regarded as a single word.

The word edition aiding apparatus embodying this invention may be used for the alteration of data recorded in a database. In this case, the data alteration in the database can be carried out in the same manner as described above.

Although, in this embodiment, a first word is replaced with a X word having the same label as that associated with the first word, the second word may be inserted just after the first word in a text. In this case, several words having the same label can be arranged side by side.

An editing apparatus according to the present invention may be designed such that a word is replaced with an image. The replacing image is selected from an image list having the same label as that associated with the replaced word. For example, when the label of a word selected by an user is "name", an image list having the label "name" is displayed on a display screen. The image list includes a plurality of human names. When the user selects one of the human names, the selected word is replaced with a photograph of a person corresponding to the selected human name. Otherwise, the photograph may be placed adjacent to the selected word.

Therefore, the present examples and embodiment are to be considered as illustrative and not restrictive and the invention is not to be limited to the details given herein, but may be modified within the scope of the appended claims.

What is claimed is:

1. An apparatus for editing text in a document, comprising:
  a display for displaying text including words on its screen;
  an input device operable by an operator to designate a word from the words of said text displayed on said display; and
  a processing unit coupled to said display and said input device and having a first memory for storing text data including data of a plurality of words, and a second memory for storing plural pieces of word data and plural pieces of label data indicating meaning suggested by individual words, each word data being paired with its corresponding label data,
  wherein said processing unit:
  A) identifies data of a first word designated by an operator using said input device, from text data stored in said first memory; and
  B) identifies label data associated with word data matching with said first word data, from said second memory, by referring to said identified first word data.

2. The apparatus according to claim 1, wherein said processing unit further has a third memory; wherein after the label data identification process (B), said processing unit:
  produces data of number corresponding to said identified label data;
  stores the produced number data and the corresponding label data to said third memory; and
  incorporates the number data, as attribute data to be attached to the first word data, to the text data stored in said first memory, referring to said identified first word data, whereby when data of a word designated by an operator is previously assigned by number data, said processing unit identifies one of label data stored in said third memory by referring to the corresponding number data.

3. The apparatus according to claim 1, wherein said processing unit has a control program including a rule for inferring a label corresponding to the first word, based on the label of a word adjacent to said first word,
  wherein said processing unit:
  identifies data of a word adjacent to the first word from among the text data stored in said first memory, when label data corresponding to the first word does not exist in said second memory in said identification process (B);
  identifies data of a label associated with the adjacent word, from said second memory, referring to the identified adjacent word data; and
  infers a label associated with the first word, based on the identified label data, according to said inferring rule, whereby the inferred label is regarded as the identified label.

4. The apparatus according to claim 3, wherein said inferring rule allows said processing unit to infer a label associated with the first word designated by an operator, based on labels corresponding to two words adjacent to the first word.

5. The apparatus according to claim 3, wherein said inferring rule allows said processing unit to infer a label associated with the first word designated by an operator, based on a label corresponding to a word preceding the first word.

6. The apparatus according to claim 3, wherein said inferring rule allows said processing unit to infer a label associated with the first word designated by an operator, based on a label corresponding to a words following the first word.

7. The apparatus according to claim 3, wherein said inferred label and said first word are registered into said second memory by said processing unit.

8. The apparatus according to claim 1, wherein said input device allows an operator to designate one of characters in the first word;
  wherein said processing unit:
  identifies a word containing a character designated by the operator and words adjacent to the character containing word, from among the text data stored in said first memory; and.
  identifies data of a label associated with a word matching with the character containing word, from said second memory, using a recursive analysis based on data of the identified character containing and adjacent words.

9. The apparatus according to claim 8, wherein said processing unit:
  identifies a first position of the designated character in text stored in said first memory;
  identifies a second position of the designated character in the identified character containing and adjacent words; and
  identifies positions of the head and tail of said character containing word in said text, referring to the deviation between said first and second positions.

10. An apparatus for editing text in a document, comprising:
  a display for displaying text including words on its screen;
  an input device operable by an operator to designate a word from the words of said text displayed on said display; and
  a processing unit coupled to said display and said input device and having a first memory for storing text data including data of a plurality of words, and a second memory for storing plural pieces of word data and plural pieces of label data indicating meaning suggested by individual words, each word data being paired with its corresponding label data,
  wherein said processing unit:
  A) identifies data of a first word designated by an operator using said input device, from text data stored in said first memory;
  B) identifies label data associated with word data matching with said first word data, from said second memory, by referring to said identified first word data;
  C) produces a list of data regarding a plurality of words associated with said identified label data and selected from words stored in said memory; and
  D) allows said display to display the words of said list on the screen.

11. An apparatus for editing text in a document, comprising:
  A display for displaying text including words on its screen;
  an input device operable by an operator to designate a word from the words of said text displayed on said display; and
  a processing unit coupled to said display and said input device and having a first memory for storing text data including data of a plurality of words, and a second memory for storing plural pieces of word data and plural pieces of label data indicating meaning suggested by individual words, each word data being paired with its corresponding label data, said processing unit incorporating a control program,
  wherein said processing unit:
  A) identifies data of a first word designated by an operator using said input device, from text data stored in said first memory;
  B) identifies label data associated with word data matching with said first word data, from said second memory, by referring to said identified first word data;
  C) produces a list of data regarding a plurality of words associated with said identified label data and selected from words stored in said second memory;
  D) allows said display to display the words of said list on the screen;
  E) identifies a second word designated by the operator using said input device, from among the displayed words on said screen; and
  F) replaces said first word data in the text data of said first memory with data of said second word.

12. The apparatus according to claim 11, wherein said processing unit further includes a data buffer for storing the word data list produced in said process (C) and the corresponding label, said data buffer having a word list area and a plurality of user selection frequency value areas associated with individual words stored in the word list area,
  wherein said processing unit:
  inputs data indicating the number of times by which an operator designates the first word, to an user selection frequency value area associated with the same word as the first word; and
  ranks the words in order of their decreasing user selection number of times, whereby individual words are arranged on the screen of the display in accordance with the ranking of user selection number of times.

13. The apparatus according to claim 12, wherein when the maximum amount of data is stored in the word list area of said data buffer, said processing unit replaces a word of the minimum user selection number of times in the word list area, with the first word.

14. The apparatus according to claim 11, wherein said input device allows an operator to designate one of the words displayed on the screen of said display as a second word and to manually input a word desired by the operator as a third word;
  wherein said processing unit:
  replace a word, stored in said second memory and matching with the first word, with said third word manually input by the operator; and
  replaces the first word in the text data stored in said first memory with said third word.

15. An apparatus for editing text in a document, comprising:
  a display for displaying text including words on its screen;
  an input device operable by an operator to designate a word from the words of said text displayed on said display;
  a processing unit coupled to said display and said input device and including a first memory for storing text data including data of a plurality of words, and a second memory for storing plural pieces of word data and plural pieces of label data indicating meaning suggested by individual words, each word data being paired with its corresponding label data; and
  said input device allowing an operator to manually replace a label with another label,
  wherein said processing unit:
  A) identifies data of a first word designated by an user using said input device, from text data stored in said first memory;
  B) identifies label data associated with word data matching with said first word data, from said second memory, by referring to said identified first word data;
  C) allows said display to display the identified label on the screen; and
  D) replaces the identified label data stored in said second memory with data of a label input by an operator using said input device.

16. An apparatus for editing text in a document, comprising:
  a display for displaying text including words on its screen;
  an input device operable by an operator to designate a word from the words of said text displayed on said display; and
  a processing unit coupled to said display and said input device, said processing unit including a first memory for storing text data including data of a plurality of words, a second memory for storing plural pieces of word data and plural pieces of label data indicating meaning suggested by individual words, each word data being paired with its corresponding label data, and a third memory for storing a user defined database and a first table, said user defined database including data of items and records, said first table indicating the correspondence of said item data with said label data, said items defining the headings of said records, each record consisting of a plurality of words, wherein said processing unit:

A) identifies data of a first word designated by an operator using said input device, from text data stored in said first memory;

B) identifies label data associated with word data matching with said first word data, from said second memory, by referring to said identified first word data;

C) identifies data of an item associated with a label matching with the identified label data, from the first table of said user defined database;

D) produces a list of data regarding a plurality of words of records, the heading of each record being specified by said identified item data; and E) allows said display to display the words of said list on the screen.

17. An apparatus for editing text in a document, comprising:

a display for displaying text including words on its screen;

an input device operable by an operator to designate a word from the words of said text displayed on said display; and a processing unit coupled to said display and said input device, said processing unit including a first memory for storing text data including data of a plurality of words, a second memory for storing plural pieces of word data and plural pieces of label data indicating meaning suggested by individual words, each word data being paired with its corresponding label data, and a third memory for storing a user defined database and a first table, said user defined database including data of items and records, said first table indicating the correspondence of said item data with said label data, said items defining the headings of said records, each record consisting of a plurality of words, wherein said processing unit:

A) identifies data of a first word designated by an operator using said input device, from text data stored in said first memory;

B) identifies label data associated with word data matching with said first word data, from said second memory, by referring to said identified first word data;

C) identifies data of an item associated with a label matching with the identified label data, from the first table of said user defined database;

D) produces a list of data regarding a plurality of words of records, the heading of each record being specified by said identified item data;

E) allows said display to display the words of said list on the screen;

F) identifies a second word designated by an operator using said input device, from among the displayed words on the screen; and G) replaces said first word data in the text data of said first memory with data of said identified second word.

18. An apparatus for editing text in a document, comprising:

a display for displaying text including words on its screen;

an input device operable by an operator to designate a word from the words of said text displayed on said display; and a processing unit coupled to said display and said input device, said processing unit including a first memory for storing text data including data of a plurality of words, a second memory for storing plural pieces of word data and plural pieces of label data indicating meaning suggested by individual words, each word data being paired with its corresponding label data, and a third memory for storing a user defined database and a plurality of tables, each of the tables containing a title that distinguishes its table from other tables, said titles serving as an index of said user defined database, said user defined database including data of items and records, each of said tables indicating the correspondence of said item data with said label data, said items defining the headings of said records, each record consisting of a plurality of words, wherein said processing unit:

A) identifies data of a first word designated by an operator using said input device, from text data stored in said first memory;

B) identifies label data associated with word data matching with said first word data, from said second memory, by referring to said identified first word data;

C) identifies data of items associated with a label matching with the identified label data, from said tables;

D) selects the titles of the tables in which said identified item data are included;

E) causes said display to display the selected titles on the screen;

F) identifies a title designated by an operator using said input device, from among the displayed titles on said display;

G) produces a list of data regarding a plurality of words of records, the heading of each record being specified by said identified item data; and H) allows said display to display the words of said list on the screen.

19. The apparatus according to claim 18, wherein said processing unit further includes a fourth memory; wherein after the title identification process (F), said processing unit:

produces data of link number corresponding to said identified title data;

stores the produced link number data and the corresponding title data to said fourth memory; and incorporates the link number data, as attribute data to be attached to the first word data, to the text data stored in said first memory, referring to said identified first word data, whereby when data of a word designated by an operator is previously assigned by link number data, said processing unit identifies one of title data stored in said fourth memory by referring to the corresponding link number data.

20. An apparatus for editing text in a document, comprising:

a display for displaying text including words on its screen;

an input device operable by an operator to designate a word from the words of said text displayed on said display; and a processing unit coupled to said display and said input device, said processing unit including a first memory for storing text data including data of a plurality of words, a second memory for storing plural pieces of word data and plural pieces of label data indicating meaning suggested by individual words, each word data being paired with its corresponding label data, and a third memory for storing a user defined database and a plurality of tables, each of the tables containing a title that distinguishes its table from other tables, said titles serving as an index of said user defined database, said user defined database including data of items and records, each of said tables indicating the correspondence of said item data with said label data, said items defining the headings of said records, each record consisting of a plurality of words, wherein said processing unit:

A) identifies data of a first word designated by an operator using said input device, from text data stored in said first memory;

B) identifies label data associated with word data matching with said first word data, from said second memory, by referring to said identified first word data;

C) identifies data of items associated with a label matching with the identified label data, from said tables;

D) selects the titles of the tables in which said identified item data are included;

E) causes said display to display the selected titles on the screen;

F) identifies a title designated by an operator using said input device, from among the displayed titles on said display;

G) produces a list of data regarding a plurality of words of records, the heading of each record being specified by said identified item data;

H) allows said display to display the words of said list on the screen;

I) identifies a second word designated by an operator using said input device, from among the displayed words on said display; and J) replaces said first word data in the text data of said first memory with data of said identified second word.

21. A data processing apparatus for inputting and editing data regarding words, patterns and images, said apparatus comprising:

data storage means for storing label data indicating meaning of each data to be edited;

data analyzing means for analyzing edition data to be edited, to identify label data based on the result of analyzing, and for supplying said data storage means with the identified label data, wherein said analyzing means has a rule for inferring a label corresponding to first edition data, based on the label of second edition data adjacent to said first edition data, wherein said analyzing means:

identifies second edition data adjacent to the first edition data, when the first edition data has no label data;

identifies data of a label associated with the second edition data, referring to the identified second edition data; and infers a label associated with the first edition data, based on the identified label data, according to said inferring rule.

22. A data processing apparatus for inputting and editing data regarding words, patterns and images, said apparatus comprising:

first data storage means for storing data;

second data storage means for storing label data indicating the meaning of each data; and a processor, coupled to said first and second data storage means, for identifying editing data that matches with the data stored in said first data storage means and identifying label data associated with the matching data from said second data storage means.

23. The data processing apparatus according to claim 22 further comprising data analyzing means for analyzing edition data to be edited, to identify label data based on the result of analyzing, and for supplying said second data storage means with the identified label data.

24. The data processing apparatus according to claim 22 further comprising means for rewriting label data stored in said second data storage means to new label data.

25. A method of editing text in a document by using a computer system including a display, an input device operable by an operator, a processor, a first memory for storing text data including data of a plurality of words, and a second memory for storing plural pieces of word data and plural pieces of label data indicating meaning suggested by individuals words, each word data being paired with its corresponding label data, said method comprising the steps of:

A) identifying data of a first word designated by an operator, from text data stored in said first memory;

B) identifying label data associated with word data matching with said identified first word data, from said second memory;

C) producing list of data regarding a plurality of words associated with said identified label data and selected from word stored in said second memory; and D) displaying the words of said list on a screen of said display.

26. A method of editing text in a document by using a computer system including a display, an input device operable by an operator, a processor, a first memory for storing text data including data of a plurality of words, and a second memory for storing plural pieces of word data and plural pieces of label data indicating meaning suggested by individual words, each word data being paired with its corresponding label data, said method comprising the steps of:

A) identifying data of a first word designated by an operator, from text data stored in said first memory;

B) identifying label data associated with word data matching with said first word data, from said second memory;

C) producing a list of data regarding a plurality of words associated with said identified label data and selected from words stored in said second memory;

D) displaying the words of said list on a screen of said display;

E) identifying a second word designated by the operator, from among the displayed words; and F) replacing said first word data in the text data of said first memory with data of said second word.

27. A computer program product for use in editing text in a document comprising:

a computer usable medium having computer readable program code means embodied therein for causing a computer system, which includes a display, an user operable input device, a first memory storing text data and a second memory storing word data and label data, A) to identify data of a first word designated by an operator, from text data stored in said first memory;

B) to identify label data associated with word data matching with said identified first word data, from said second memory, wherein label data indicate meaning suggested by individual words, each word data being paired with its corresponding label data;

C) to produce a list of data regarding a plurality of words associated with said identified label data and selected from words stored in said second memory; and D) to display the words of said list on a screen of said display.

* * * * *